(12) United States Patent
Kandemir et al.

(10) Patent No.: US 11,868,887 B2
(45) Date of Patent: Jan. 9, 2024

(54) MAKING TIME-SERIES PREDICTIONS OF A COMPUTER-CONTROLLED SYSTEM

(71) Applicant: Robert Bosch GmbH, Stuttgart (DE)

(72) Inventors: Melih Kandemir, Stuttgart (DE); Sebastian Gerwinn, Leonberg (DE); Andreas Look, Stuttgart (DE); Barbara Rakitsch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 297 days.

(21) Appl. No.: 17/340,978

(22) Filed: Jun. 7, 2021

(65) Prior Publication Data

US 2021/0397955 A1    Dec. 23, 2021

(30) Foreign Application Priority Data

Jun. 16, 2020 (EP) .................................... 20180249

(51) Int. Cl.
*G06N 3/08* (2023.01)
*G05B 13/02* (2006.01)
*G05B 13/04* (2006.01)
*G06N 3/047* (2023.01)

(52) U.S. Cl.
CPC ............. *G06N 3/08* (2013.01); *G05B 13/027* (2013.01); *G05B 13/048* (2013.01); *G06N 3/047* (2023.01)

(58) Field of Classification Search
CPC ........ G06N 3/08; G06N 3/047; G05B 13/027; G05B 13/048; G05B 17/02
See application file for complete search history.

(56) References Cited

U.S. PATENT DOCUMENTS 6,532,454 B1 *  3/2003  Werbos .................. G06N 20/00
                                                706/14
10,600,005 B2 *  3/2020  Gunes ...................... G06N 3/08
                        (Continued)

FOREIGN PATENT DOCUMENTS

CN          109299429 A       2/2019

OTHER PUBLICATIONS

Look et al., "Differential Bayesian Neural Nets," Cornell University, 2020, pp. 1-4. <https://arxiv.org/pdf/1912.00796.pdf> Downloaded Jun. 3, 2021.

(Continued)

*Primary Examiner* — Kurt Philip Liethen
(74) *Attorney, Agent, or Firm* — NORTON ROSE FULBRIGHT US LLP; Gerard A. Messina

(57) ABSTRACT

A computer-implemented method of training a model for making time-series predictions of a computer-controlled system. The model uses a stochastic differential equation (SDE) comprising a drift component and a diffusion component. The drift component has a predefined part representing domain knowledge, that is received as an input to the training; and a trainable part. When training the model, values of the set of SDE variables at a current time point are predicted based on their values at a previous time point, and based on this, the model is refined. In order to predict the values of the set of SDE variables, the predefined part of the drift component is evaluated to get a first drift, and the first drift is combined with a second drift obtained by evaluating the trainable part of the drift component.

20 Claims, 5 Drawing Sheets

(56) References Cited

U.S. PATENT DOCUMENTS

| | | | | |
|---|---|---|---|---|
| 2013/0325774 | A1* | 12/2013 | Sinyavskiy | G06N 3/08 706/23 |
| 2017/0147722 | A1* | 5/2017 | Greenwood | G06N 3/126 |
| 2019/0259095 | A1 | 8/2019 | Templeton | |
| 2019/0332923 | A1* | 10/2019 | Gendron-Bellemare | G06N 3/084 |
| 2020/0394559 | A1* | 12/2020 | Zhang | G06N 3/045 |

OTHER PUBLICATIONS

Li et al., "Stochastic Runge-Kutta Accelerates Langevin Monte Carlo and Beyond," Cornell University, 2020, pp. 1-4. <https://arxiv.org/pdf/1906.07868.pdf> Downloaded Jun. 3, 2021.
Särkkä et al., "Applied Stochastic Differential Equations," Aalto University, 2019, Chapter 9. <https://users.aalto.fi/~asolin/sde-book/sde-book.pdf> Downloaded Jun. 3, 2021.
Kingma et al., "ADAM: A Method for Stochastic Optimization," Cornell University, 2017, pp. 1-15. <https://arxiv.org/pdf/1412.6980.pdf> Downloaded Jun. 3, 2021.
Zhao et al., "State-Space Gaussian Process for Drift Estimation in Stochastic Differential Equations," ICASSP 2020—2020 IEEE International Conference on Acoustics, Speech and Signal Processing (ICASSP), 2020, pp. 5295-5299.
Rajabzadeh et al., "A Dynamic Modeling Approach for Anomaly Detection Using Stochastic Differential Equations," Digital Signal Processing, Science Direct, vol. 54, 2016, pp. 1-11.
Tzen et al., "Neural Stochastic Differential Equations: Deep Latent Gaussian Models in the Diffusion Limit," Cornell University, 2019, pp. 1-18.

\* cited by examiner

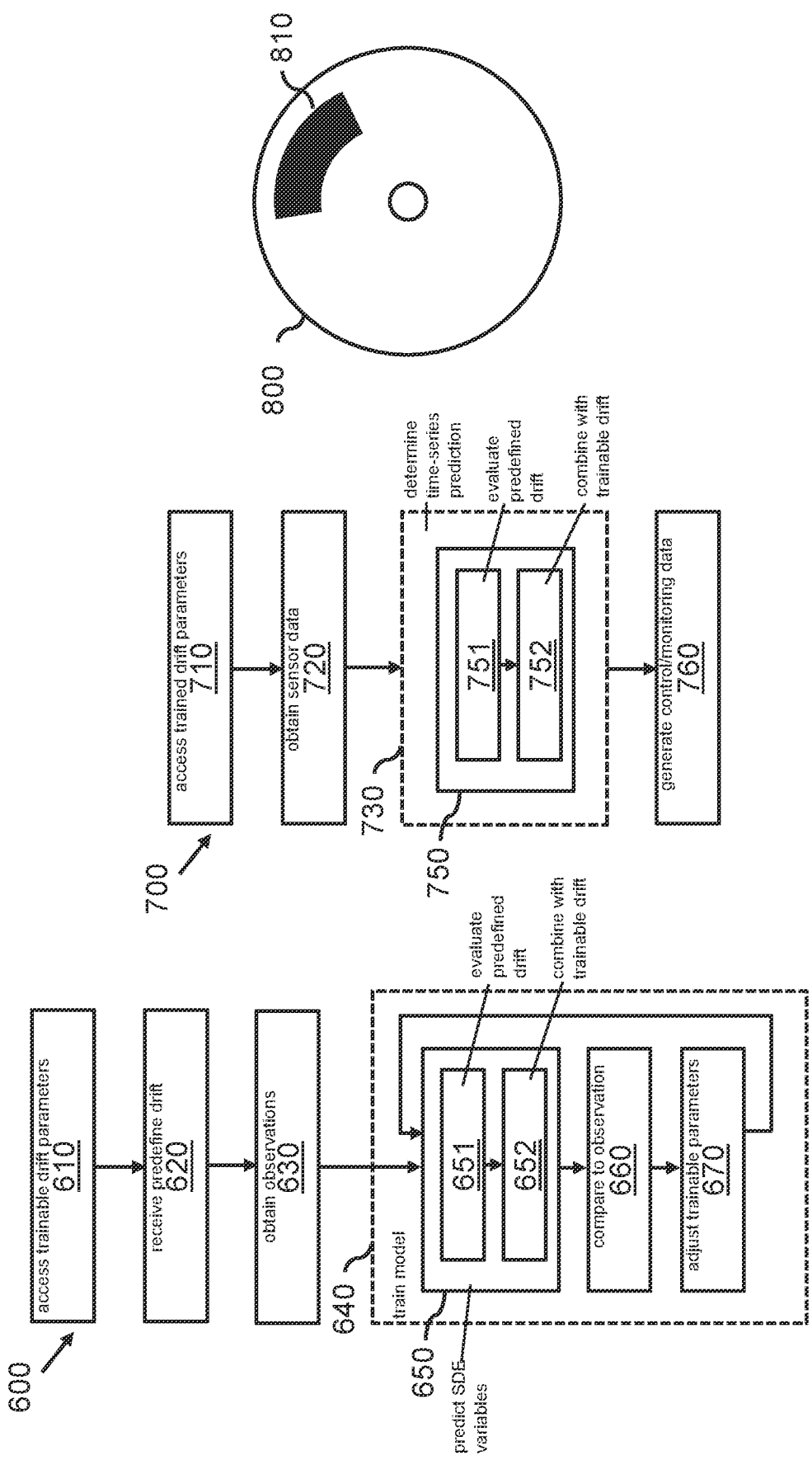

MAKING TIME-SERIES PREDICTIONS OF A COMPUTER-CONTROLLED SYSTEM

CROSS REFERENCE

The present application claims the benefit under 35 U.S.C. § 119 of European Patent Application No. EP 20180249.3 filed on Jun. 16, 2020, which is expressly incorporated herein by reference in its entirety.

FIELD

The present invention relates to a computer-implemented method of training a model for making time-series predictions of a computer-controlled system based; and to a corresponding system. The present invention further relates to a computer-implemented method of using a trained model to make a time-series prediction of a computer-controlled system; and to a corresponding system. The present invention further relates to a computer-readable medium comprising instructions to perform one or both of the above methods, and/or comprising model data representing a trained model.

BACKGROUND INFORMATION

In many real-life applications, it is desirable to use models to make time-series predictions of a computer-controlled system. As a practical example, in a gasoline particulate filter for gasoline engines, soot particles accumulate on the filter. Thus, to keep the filter functioning, the accumulation of soot particles needs to be predicted so that a cleaning operation (e.g., using oxygen bursting) can be initiated in time. More generally, in such a computer-controlled system, typically one or more sensors are used to obtain measurements of the system and/or its environment, and one or more actuators are used to perform actions that affect the environment. Computer-controlled systems include robotic systems, in which a robot can perform one or more tasks automatically, e.g., under control of an external device or an embedded controller. Further examples are vehicles and components thereof, domestic appliances, power tools, manufacturing machines, personal assistants, access control systems, drones, nanorobots, and heating control systems.

In many cases, it is unfortunately not feasible to make such time-series predictions based on an explicit physical model. For gasoline particulate filters, simulators are available that can make reasonably accurate predictions, but using such a simulator comes with a high computational cost, making it prohibitive for real-time application such as controlling and monitoring. Generally, the underlying physical model of a computer-controlled system and/or its environment is often too complicated to be modelled explicitly, or to be simulated effectively.

In such examples where it is not feasible to use a physical model, a promising approach is to instead use machine-learning techniques to train a model to make time-series predictions. Such a model may be trained on measurements of physical quantities. This way, it is possible to automatically determine a model matching the available observations. Unless noted otherwise, in this specification, a measurements of a given physical quantity can be direct (e.g., obtained from a sensor for the physical quantity, sometimes also called an observed quantity) or indirect (e.g., computed from measurements of other physical quantities, sometimes also called a latent quantity).

It is particularly promising to use models based on stochastic differential equations (SDEs), since they allow to capture the stochasticity, e.g., noise, that is present in many systems occurring in practice. In "Differential Bayesian Neural Nets" by A. Look et al. (available at https://arxiv.org/abs/1912.00796 and incorporated herein by reference), a trainable model is described for making time-series predictions based on SDEs. The drift and diffusion components of the SDE are both modelled as Bayesian Neural Networks. The posterior on their weights is inferred using Stochastic Gradient Langevin Dynamics.

Unfortunately, existing trainable prediction models based on SDEs have several disadvantages. When applied in practice, existing models are often not sufficiently accurate, making it harder to effectively control or monitor the computer-controlled system at hand. Moreover, a large amount of training data is often needed to reach a certain degree of accuracy. Since training data is typically based on real-world measurements, it is often expensive or difficult to obtain. Also training efficiency is a problem, e.g., in many applications, existing models may take long to converge or may not converge at all. Finally, a drawback is that the existing trainable SDE models are typically black-box models that provide little or no explainability and accordingly offer little insight into how a prediction is determined, making it hard to debug such models and hampering trust in their results.

SUMMARY

It would be desirable to have trainable prediction models that allow to predict physical quantities more accurately, that can be trained more efficiently based on fewer measurements, and/or that provide more insight in how the model arrives at its prediction.

In accordance with a first aspect of the present invention, a corresponding computer-implemented method and a corresponding system for training a model for making time-series predictions of a computer-controlled system are provided. In accordance with another aspect of the present invention, a computer-implemented method and a corresponding system for using a trained model to make a time-series prediction of a computer-controlled system are provided. In accordance with an aspect of the present invention, a computer-readable medium is provided.

Various aspects of the present invention relate to making a time-series prediction of a computer-controlled system. Such a prediction may be represented in terms of a set of variables, sometimes referred to herein as observation variables. The model may also be trained based on a set of time-series observations of these observation variables. Generally, an observation variable may represent one or more physical quantities of the computer-controlled system, e.g., a state of a robotic arm may be represented as angles, angular velocities, joint positions, etc. Instead or in addition, observation variables may represent physical quantities of an environment of the computer-controlled system. For example, steering dynamics of an autonomous vehicle may be learned from a video camera mounted in the autonomous vehicle which is directed towards the road ahead of the vehicle.

In accordance with an example embodiment of the present invention, to make the time-series prediction, a stochastic differential equation is used. (SDE). The SDE is defined in terms of a set of SDE variables. The SDE variables may correspond to the set of observation variables, and may thus represent (direct or indirect) measurements of physical quantities of the computer-controlled system and/or its environment. As discussed in more detail below, the SDE variables can also be related to measurements through an observation model, in which case an SDE variable may or may not themselves represent a measurement of a physical quantity.

Generally, an SDE is a differential equation comprising a stochastic process. An SDE comprises a drift component and a diffusion component. The stochastic process is defined by the diffusion component, typically as a product of the diffusion component and a noise variable, often a derivative of a Brownian motion or a Wiener process. The remainder of the SDE that does not form the stochastic process, is called the drift component. The drift component may be regarded as modelling the deterministic dynamics of the system, while the diffusion component may be regarded as modelling the stochasticity in the system. One advantage of the use of SDEs for making time-series predictions, compared for example to ordinary differential equations (ODEs), is that SDEs allow to more accurately model systems that exhibit stochasticity. SDEs also enable the provision of uncertainty estimates of the given predictions. This is important for many practical applications, for example, in robotics in order to maintain a safety margin when steering the robot, etcetera.

Interestingly, in various embodiments of the present invention, a model is used in which the drift component of the SDE comprises a trainable part and a predefined part. The predefined part may be received as an input to the training. The predefined part of the drift component may represent domain knowledge about the computer-controlled system that can be used to improve the training, and thereby, the resulting model. For example, the predefined drift part can be provided as an ordinary differential equation, e.g., derived from physics or based on a phenomenological model of the computer-controlled system. In many practical situations, such domain knowledge, e.g., a coarse and/or incomplete description of computer-controlled system, may be available. For instance, the dynamics of a three-dimensional volume may be modelled as a flow through a single point, such as the centre of mass. As another example, a model on a subset of the system components might be provided. To evaluate the SDE at a certain time point, the predefined part r and the trainable part f of the drift component may both be evaluated and then combined (e.g., added) into an overall drift.

Generally, a wide range of types of domain knowledge can be integrated into a trainable SDE in this way, e.g., the techniques presented herein are not restricted to any particular type of hardcoded dynamics but can work with various types of predefined drift parts provided at runtime.

When training the model, first, the predefined part r of the drift component may be received as input, and then other parts of the model may be trained using this predefined part, including at least the trainable part f of the drift component. During the optimization of these other parts, the predefined part of the drift component typically remains constant. That is, the predefined part is not parameterized by parameters that are trained during the training. In particular, given a training set of time-series observations of the computer-controlled system and/or its environment, the model may be trained by using the model to make a time-series prediction; deriving a training signal by comparing the prediction to an observation; and adjusting the set of parameters of the trainable part of the drift component based on the training signal. Also other parameters may be adjusted: for example, the diffusion component may be trainable as well, to dynamically adapt to the stochastic noise present in the computer-controlled system at hand. To make the time-series prediction, the predefined and trainable parts of the drift component may be evaluated and the results combined into an overall drift. Thus, the trainable part of the drift component may be optimized to provide a drift contribution that best combines with the drift contribution of the predefined part of the drift component to provide an optimal overall drift for the SDE.

Similarly, applying the trained model to make a time-series prediction of the computer-controlled system may involve using the SDE to predict values of the set of SDE variables at a current time point based on their values at a previous time point. As part of this, drifts provided by the trained part of the drift component and by the predefined part of the drift component may be combined into an overall drift. Accordingly, also during use, the contribution to the drift of the predefined part of the drift component may be combined with an optimal (e.g., optimized) contribution of the trained part of the drift component to obtain an optimal overall drift. Using the time-series prediction, the computer-controlled system may be controlled and/or monitored.

In many situations, inclusion of the predefined part in the drift component of the SDE, leads to a model that is more easily trainable and/or provides more accurate predictions. Effectively, the trainable part of the drift model just needs to compute a deviation from the value provided by the predefined part, which is an easier learning task than computing the entire drift component. In particular, due to the inclusion of the predefined part, the initial estimate of the dynamics provided by the SDE may be more accurate than if the predefined part were not included, which typically leads to faster convergence and a better optimum. Also, less training data, and accordingly fewer measurements, are needed to attain a given model accuracy.

Another advantage is that it is possible to combine a trainable part of the drift component that is selected for being well suited to optimization techniques like stochastic gradient descent, e.g., a trainable part having a neural network-type architecture, with a predefined part that is described in any way that is suitable for modelling the computer-controlled system at hand, e.g., as a closed formula or as an external (e.g., Simulink) model. The predefined part may not have an efficiently-computable derivative, for instance. Also using a trainable part well-suited for training and a predefined part well-suited to model the computer-controlled system helps to achieve more accuracy and better training performance than would be possible, e.g., when using just a neural network to compute the drift.

Another advantage of using a predefined part, is that it leads to a model with increased explainability. Since the model includes the predefined parts, its outputs can also be understood as being based on the drift that it provides. The contribution of the trainable part may be regarded as a black-box model of the deviation from the, e.g., physically motivated, model that is used as the predefined part.

As discussed, an alternative to the presented techniques is to model a dynamic environment by manually defining a differential equation system (e.g., as formulated by a domain expert). Modelling obvious regularities in physical phenomena in this way is feasible, but in practice, excelling at simulating their behaviour is hard. Experience shows that it suffices to have a relatively small set of variables in straight-forward relationships to reach a Pareto frontier with reasonable effort and expertise. However, pushing a model beyond this frontier towards high fidelity either requires long expert dedication time or demands a large amount of computational resources. Interestingly, more accurate simulations are possible with the presented techniques in accordance with the present invention. Also, physically motivated models moreover oftentimes exhibit non-robust numerical behaviours. The inventors observed that models trained according to the presented techniques can have increased computational robustness due to their more graceful computational properties.

Interestingly, the inventors found that, to attain these advantages, it is not needed that the predefined part of the drift component is by itself very accurate or complete. For example, it is possible to use a predefined part that models only a subset of the variables of the SDE. Or, it is possible to use a much-simplified model of the computer-controlled system as the predefined part, e.g., a linearized model or a model in which an area or a volume is modelled as a single point. Below, several practical examples are provided in which this is demonstrated. As long as the predefined drift component provides values that are to some degree correlated with the actual drift (e.g., the deterministic dynamics of the computer-controlled system), inclusion of the predefined drift component in a trainable SDE will typically lead to a more accurate and/or more easily trainable model.

Optionally, in accordance with an example embodiment of the present invention, the trainable part of the drift component and the diffusion component may be Bayesian models. For example, the diffusion component can be trained along with the trainable part of the drift component based on the same training signal. By using Bayesian models, e.g., Bayesian neural networks, inside the SDE, it is possible to represent predictive uncertainty and thereby get a well-calibrated predictive uncertainty. For example, the inventors found that, compared to using a regular neural network in an SDE, the use of a Bayesian neural network may provide much more accurate uncertainty scores.

Optionally, in accordance with an example embodiment of the present invention, the model may further comprise an observation model providing a mapping between the set of variables of the SDE and a set of observation variables. The model may determine time-series predictions in terms of the observation variables, and also the training observations may be represented in terms of values for the set of observation variables. The set of SDE variables can be a subset of the observation variables, or the set of observation variables may be projected onto a (typically smaller) set of SDE variables. This can lead to a model that is more efficient and better trainable, and therefore more accurate. To determine a time-series prediction, values for the SDE variables may be predicted according to the SDE, and then these values for the SDE variables may be used by the observation model to predict values of the observation variables.

It is also possible for the observation model to be trainable, e.g., it can be trained along with the trainable part of the drift component and/or the diffusion component. This way, the mapping between observation variables and SDE variables, and accordingly also the interpretation of the predefined part of the drift component in terms of observation variables, can be dynamically adjusted to the computer-controlled system at hand. For example, a predefined drift component and an initial observation model may be available, based on measurements from a computer-controlled system similar to the present one. However, the predefined drift component may not be well calibrated to the present computer-controlled system. Having a trainable observation model allows for compensation of this calibration mismatch by dynamically adjusting the way measurements are mapped to the SDE variables in which the predefined drift component is defined. For example, it can be beneficial to use the same set of SDE variables and observation variables, and an observation model that is initially set to the identity function and is trained to effectively calibrate the predefined drift component to the present computer-controlled system.

Optionally, in accordance with an example embodiment of the present invention, a noise model may be used, defining a probability of making a noisy measurement of a given observation. For example, the noise model may be defined in terms of the SDE variables, or, if using, in terms of observation variables of an observation model. In training, having determined a time-series prediction, the noise model may be used to determine a likelihood of a measurement of the selected observation being observed according to a determined prediction, for example, a log-likelihood. In use, making a time-series prediction can optionally comprise applying the noise model to predict a noisy measurement. Thus, the noise model can allow accurate modelling of measurement errors.

One way of inferring the parameters of the model, such as the parameters of the trainable part of the diffusion component, is by applying posterior inference. In particular, a time series prediction may be made based on a posterior distribution of variables of the drift and diffusion models. This posterior can be approximated, e.g., using variational inference or Markov Chain Monte Carlo (MCMC).

Interestingly, however, the inventors realized that results can be improved by applying model selection instead of posterior inference. Accordingly, the model may be trained based on the set of observations by performing a maximum likelihood estimation. In the stochastic setting, this means marginalizing out latent (e.g., intermediate) variables apart from the parameters to be trained (e.g., parameters of Bayesian neural networks, if using; values for SDE variables, if a noise/observation model is used; and values for observation variables, if a noise model is used), and maximizing the marginal likelihood for the parameters to be trained. The maximum likelihood estimation can for example be based on a likelihood (e.g., a log-likelihood) of a measurement being observed according to a noise model, as described above. The combination of applying model selection and Bayesian models at least for the trainable part of the drift component is referred to herein as the "Empirical Bayes" method.

Applying model selection instead of posterior inference is advantageous for several reasons. Compared to applying Markov Chain Monte Carlo, it is avoided to directly sample global latent variables such as the parameters of Bayesian models, which induces a high estimator variance. Compared to variational inference, it is avoided to make simplifying assumptions on the posterior to assure a closed-form calculation of transition density, or to introduce a second approximation by Monte Carlo sampling. Generally, compared to posterior inference, model selection effectively directly models the marginal predictive distribution, instead of e.g. first inferring the posterior distribution on the model parameters and then calculating the posterior predictive distribution. This means that computations are more efficient and can be feasibly performed while requiring fewer simplifying assumptions to be made along the way. For example, it is not necessary to construct Markov chains on the global model parameters. Also, training stability is improved.

Optionally, in accordance with an example embodiment of the present invention, in order to further improve training efficiency, the trainable part of the drift component may be evaluated by sampling values of a parameter-free random variable and deterministically evaluating the trainable part based on these sampled values. This is then done when using the model as well. For example, when using gradient-based optimization, this avoids passing gradients on the parameters of the trainable part of the drift component, which can be quite large in number for example for a neural network. In particular, the trainable part of the drift component may be evaluated based on the sampled values by determining statistical parameters of a linear activation of a node of the trainable part, and deterministically computing this linear activation based on the statistical parameters and the values of the random variable. This leads to a particularly large reduction in the variance of the marginal likelihood, and accordingly, to particularly fast optimization convergence.

Optionally, in accordance with an example embodiment of the present invention, when deriving the training signal, a regularization term may be evaluated for minimizing a difference between the model including the trainable drift component and the model excluding the trainable drift component. Accordingly, models may be encouraged during training to stay close to the predefined drift component, and accordingly are expected to reduce overfitting and generalize better to unseen data. Such overfitting is prevented because the regularization term penalizes high complexity, e.g., steers the model towards explanations of the data that are as simple as possible.

Interestingly, the inventors were able to show that, as a regularization term, it is particularly beneficial to use a Kullback-Leibler (KL) divergence between a posterior distribution on predictions of the model including the trainable drift component and of the model excluding the trainable drift component. The inventors found that this KL divergence can be determined in the case when the models used in the SDE are Bayesian models, by combining a divergence for non-Bayesian models with a divergence between prior and posterior distributions for the parameters of the respective Bayesian models. The inventors were able to show that, by applying gradient-based optimization to a loss term including a log-likelihood loss and this particular Kullback-Leibler divergence, a training procedure is obtained for which a PAC (probably approximately correct) bound can be shown to hold. Such a PAC bound allows the derivation of strong mathematical guarantees on learning performance, and thus, the PAC bound mathematically guarantees high generalizability of the trained model. This particular choice for the regularization term, in combination with Bayesian models in the SDE, is referred to as the "Empirical PAC Bayes" training method.

Optionally, in accordance with an example embodiment of the present invention, the first drift and the second drift may be combined by combining a value of the first drift and a corresponding value of the second drift according to a weight value. The weight value may indicate a weight of the predefined part of the drift component in said combination. Different weight values may be defined for different values. The weight values can be predefined, e.g., to fully or partially block contributions of the predefined part of the drift component for certain SDE variables. Interestingly, the weight values can also be trained as part of the training. This way, it is possible to dynamically learn how to optimally combine the predefined and trainable parts of the drift component. For example, some parts of the predefined drift component may be more accurate than other parts, and accordingly may receive weight values causing them to contribute more strongly to the overall drift. Having trainable weights also allows the predictions made during training to transition from initially relying more strongly on the predefined part towards later relying, at least for some values, less on the predefined part when no longer needed.

Optionally, in accordance with an example embodiment of the present invention, the predefined part of the drift component may be determined, before the training, by fitting a parametrized differential equation to the set of observations. For example, based on domain knowledge, a domain expert may formulate a differential equation, for example, an ordinary differential equation in the set of SDE variables. Similarly, a parametrized ordinary differential equation may be known describing the computer-controlled system or a part of it, for example, in the form of a phenomenological model. Such differential equations may be parameterized to be adaptable to different situations in which the computer-controlled system may be applied. By instantiating the differential equation based on the training observations, a predefined part of the drift component may be obtained that is well adapted to the data at hand. Still, while training the trainable part of the drift component, the predefined part of the drift component remains fixed. Accordingly, for example, conventional techniques for fitting differential equations can be used to determine the predefined part of the drift component, while the trainable part may use a model that is more suited to the setting of a machine-learnable SDE, e.g., a model that allows optimization-based learning and/or that can provide uncertainty estimates.

Based on time-series predictions made as described herein in accordance with an example embodiment of the present invention, output data may be generated that can be used for controlling and/or monitoring the computer-controlled system. The output data can be the time-series prediction itself. The output data can also include or be based on an uncertainty of the time-series prediction, e.g., a per-time-step uncertainty or a global uncertainty. For example, such an uncertainty may be derived from sampling multiple (e.g., at least 20, or at least 100) time-series predictions, based on the same initial set of SDE variables. It is also possible to visualize the uncertainty, for example, by visualizing these multiple time-series predictions, e.g., by plotting time series of one or more SDE and/or observation variables. The output data may be provided, via an output interface, to an output device which is used in the control or monitoring of the computer-controlled system.

Optionally, in accordance with an example embodiment of the present invention, the output device is an actuator associated with the computer-controlled, and the processor subsystem is configured to control the computer-controlled system by providing control data to the actuator which is based on the determined time-series prediction. For example, the actuator may be used to control a vehicle, such as an autonomous or semi-autonomous vehicle, a robot, a manufacturing machine, a building, etc.

Optionally, in accordance with an example embodiment of the present invention, the trained model can be used for training the computer-controlled system by acting as an environment model providing time-series predictions of the environment of the computer-controlled system. Thus, interactions with the environment can be simulated, based on which the computer-controlled system can be trained using techniques that are known per se, for example, from model-based reinforcement learning. This way, fewer environment interactions may be needed for training the computer-controlled system. For example, the computer-controlled system may be a robot arm, in which the environment model may be used to predict the effect of performing certain actions (e.g., an applied torque) on the motion of robot arm (e.g., joint positions).

A particular application area for the provided techniques in accordance with the present invention is in a control system of a (semi-) autonomous vehicle. The model may be configured to make a time-series prediction of a mechanical component of the vehicle. In many cases, the SDE variables can be chosen to coincide with the observation variables. Generally, the time-series predictions provided by the model can be used to monitor the performance of the vehicle (e.g., to warn of too high emissions), or to control the vehicle (e.g., by adapting driving parameters to reduce emissions, by activating oxygen bursting to remove excess soot, or by controlling a charging of a hydrogen motor).

In one example, the mechanical component of the vehicle can be an exhaust gas treatment component of a vehicle, e.g., a selective catalytic reduction (SCR), a three-way-catalyst (TWC), or a diesel oxidation catalyst (DOC). The observation variables may in this case include one or more of a pressure, a temperature (up- and/or downstream of the component), an emission quantity (up- and/or downstream of the component), and inputs to the component (e.g., $NH_3$ dosing in the case of a SCR catalyst). For example, the model can be used to determine predicted emissions, for example to adjust driving parameters. Various models are available in this context that can serve as predefined drift components, e.g., an ETAS ASCMO model.

In another example, the mechanical component of the vehicle can be a stack of multiple fuel cells of a hydrogen motor. The model may capture the dynamics of storing chemical reaction energy in the fuel cells. Observation variables in this case can comprise one or more of a pressure, a temperature, a humidity, and an electric load (e.g., generated torque represented as a voltage). In practice, the number of cells can be large, e.g., at least 100 or at least 1000. This is another example application, where nowadays only coarse dynamic models are available whose accuracy can thus be improved by the provided techniques. The provided techniques also allow to dynamically calibrate such a model to new settings, decreasing the calibration effort.

In still another example, the mechanical component of the vehicle can be a particle filter, for example, a gasoline particulate filter (GPF), the observation variables comprising one or more of an engine pressure, a mass flow, a soot mass, and a number of soot particles. It is currently possible to model particle filters with medium-to-high fidelity with simulators at a high computational cost, making predictions prohibitive for real-time applications. Direct measurement of soot mass is expensive. By using a reduced version of the model of such a simulator as a predefined drift for the presented techniques, a cheap and scalable way of obtaining predictions is achieved, whose predictions can be used by the vehicle's Engine Controlling Unit. For example, if the soot mass is predicted to exceed a threshold, a cleaning operation such as oxygen bursting can be activated or signalled.

It will be appreciated by those skilled in the art, in view of the disclosure herein, that two or more of the above-mentioned embodiments, implementations, and/or optional aspects of the present invention may be combined in any way deemed useful. Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 6 shows a computer-implemented method of training a model for making time-series predictions of a computer-controlled system based on a set of observations, in accordance with an example embodiment of the present invention.

FIG. 7 shows a computer-implemented method of using a trained model to make a time-series prediction of a computer-controlled system, in accordance with an example embodiment of the present invention.

FIG. 8 shows a computer-readable medium comprising data, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
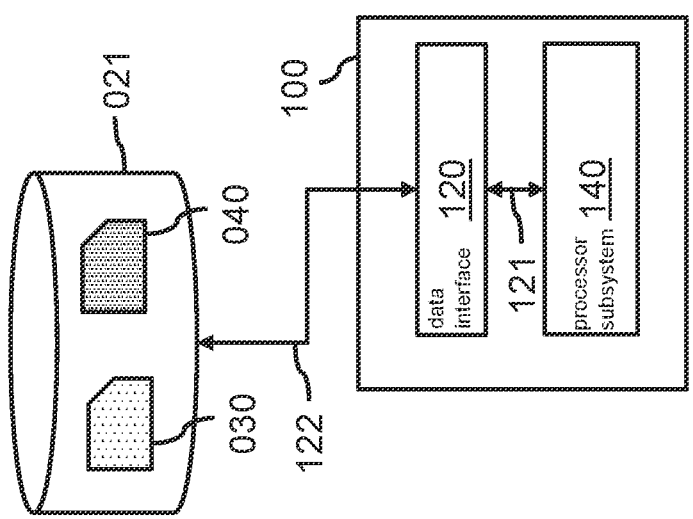
FIG. 1 shows a system for training a model for making time-series predictions, in accordance with an example embodiment of the present invention.

FIG. 1 shows a system 100 for training a model for making time-series predictions of a computer-controlled system based on a set of observations of the computer-controlled system and/or its environment. The model may use a stochastic differential equation (SDE) in a set of SDE variables. The SDE may comprise a drift component and a diffusion component.

The system 100 may comprise a data interface 120 and a processor subsystem 140 which may internally communicate via data communication 121. Data interface 120 may be for accessing model data 040 defining the model. The model data may comprise at least a set of parameters of a trainable part of the drift component of the SDE. As shown in the figure, data interface 120 may also optionally be for accessing a set of observations 030 of the computer-controlled system. The model data 040 may be for use in making a time-series prediction of the computer-controlled system according to a method described herein, e.g., by system 200 of FIG. 2.

The processor subsystem 140 may be configured to, during operation of the system 100 and using the data interface 120, access data 030, 040. For example, as shown in FIG. 1, the data interface 120 may provide access 122 to an external data storage 021 which may comprise said data 030, 040. Alternatively, the data 030, 040 may be accessed from an internal data storage which is part of the system 100. Alternatively, the data 030, 040 may be received via a network from another entity. In general, the data interface 120 may take various forms, such as a network interface to a local or wide area network, e.g., the Internet, a storage interface to an internal or external data storage, etc. The data storage 021 may take any known and suitable form.

Processor subsystem 140 may be configured to, during operation of the system 100 and using the data interface 120, receive, as a training input, a predefined part of the drift component of the SDE. The predefined part of the drift component may be comprised in model data 040, hardcoded in instructions for training the model, specified by a user, etc. Processor subsystem 140 may further obtain a set 030 of observations of the computer-controlled system. An observation may comprise a time series of measurements of the computer-controlled system and/or its environment. In the figure, the observations are accessed via data interface 120, but this is not needed, e.g. observations may be obtained via a sensor interface, for example, as discussed with respect to FIG. 2.

Processor subsystem 140 may further train the model based on the set of observations. To train the model, processor subsystem 140 use model to make a time-series prediction. This may comprise using the SDE to predict values of the set of SDE variables at a current time point based on values of the set of SDE variables at a previous time point, which may comprise evaluating the predefined part of the drift component to get a first drift and combining the first drift with a second drift obtained by evaluating the trainable part of the drift component. The training may further comprise deriving a training signal by comparing the time-series prediction to an observation of the set of observations; and adjusting at least the set of parameters of the trainable part of the drift component based on the training signal.

The system 100 may further comprise an output interface for outputting trained model data representing the learned (or 'trained') model. For example, as also illustrated in FIG. 1, the output interface may be constituted by the data interface 120, with said interface being in these embodiments an input/output ('IO') interface, via which the trained model data 040 may be stored in the data storage 021. For example, the model data 040 defining the 'untrained' model may during or after the training be replaced, at least in part, by the model data of the trained model, in that the parameters of the model, such as weights and other types of parameters of neural networks, may be adapted to reflect the training on the training data 030. In other embodiments, the trained model data may be stored separately from the model data 194 defining the 'untrained' dynamics model. In some embodiments, the output interface may be separate from the data interface 120, but may in general be of a type as described above for the data storage interface 120.

Figure 3:
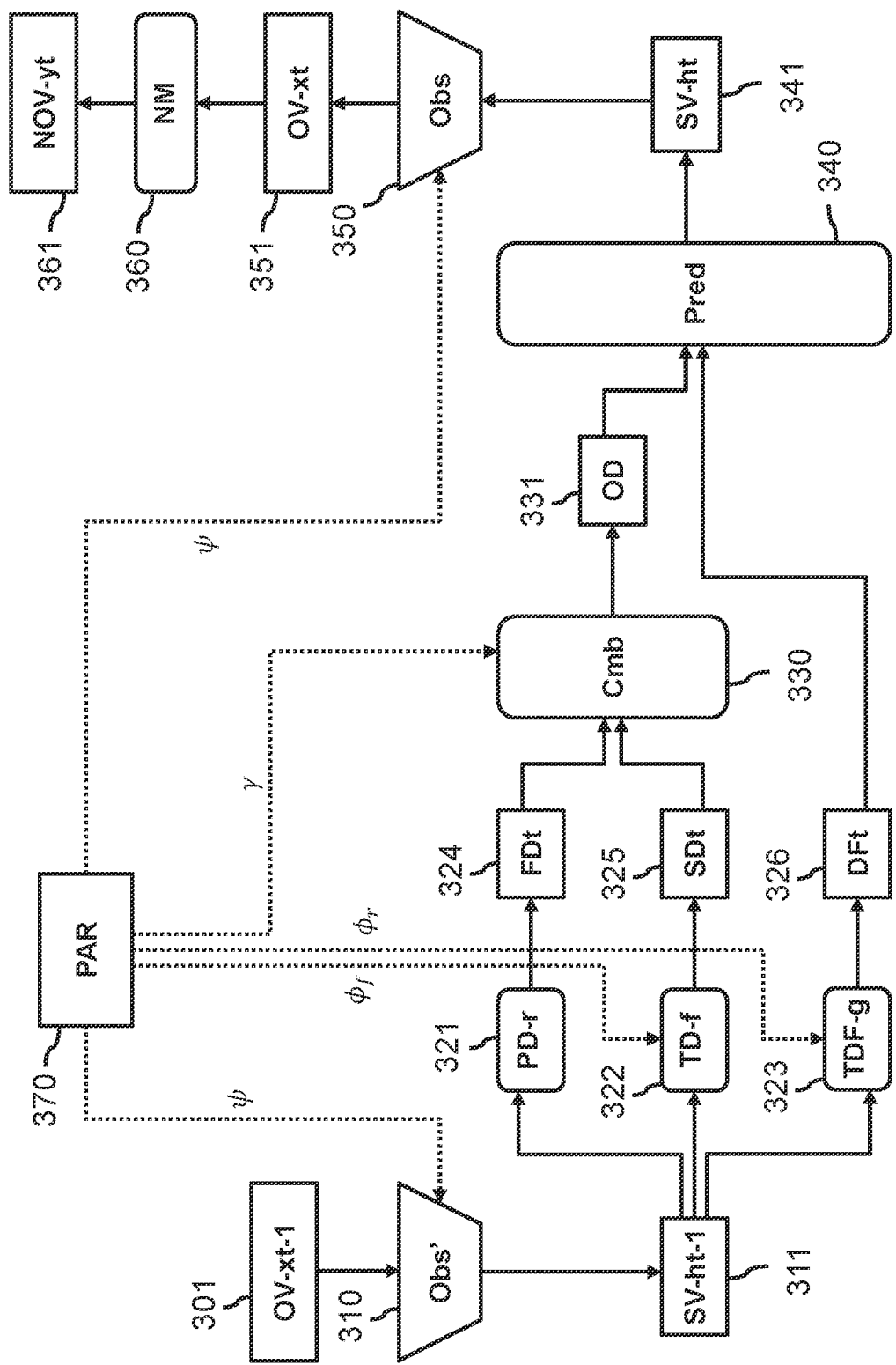
FIG. 3 shows a detailed example of a trainable model, in accordance with an example embodiment of the present invention.
Figure 4:
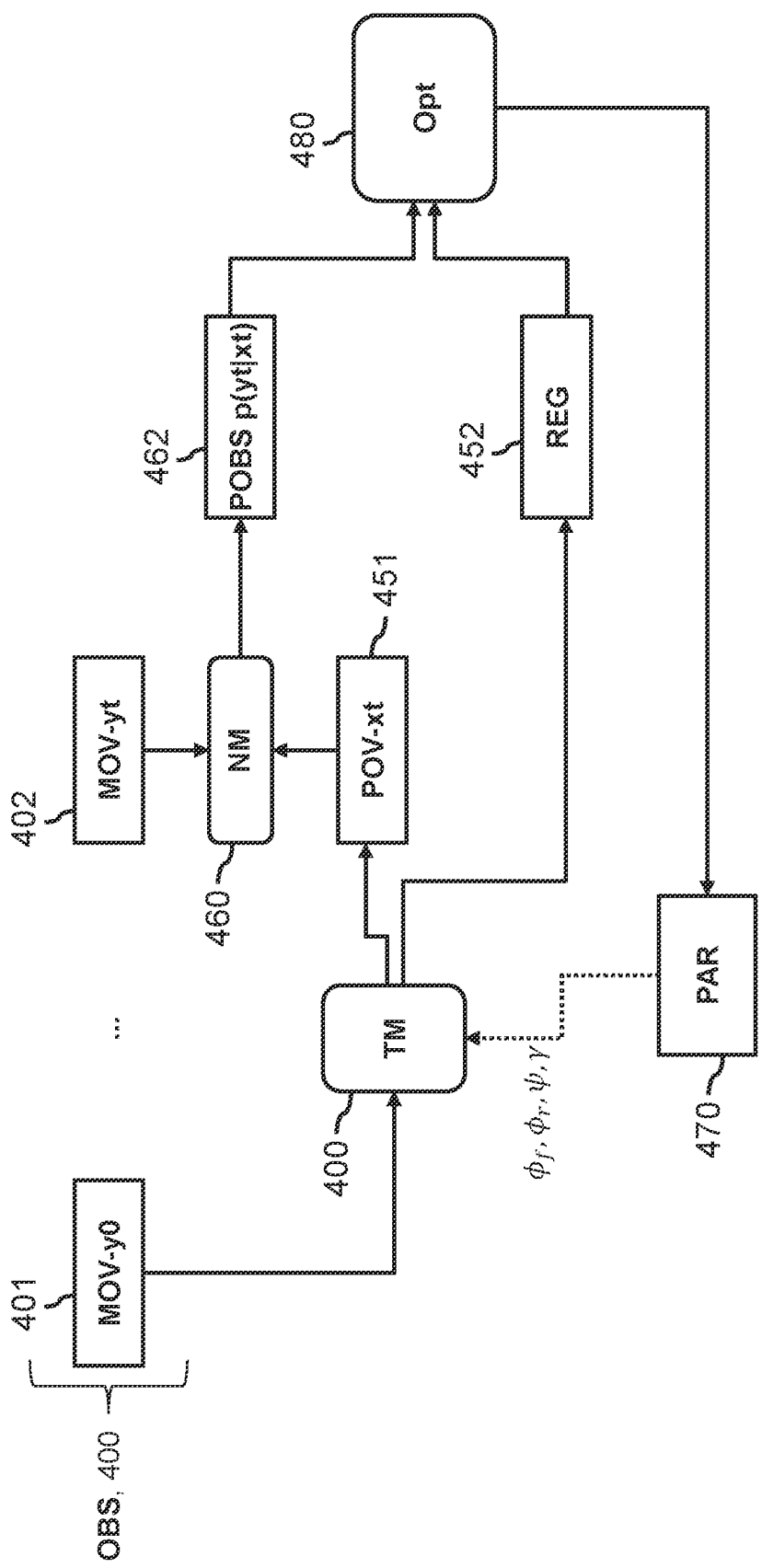
FIG. 4 shows a detailed example of training a model based on observations, in accordance with an example embodiment of the present invention.

Various details and aspects of the operation of the system 100 will be further elucidated with reference to FIGS. 3-4, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU) or Graphical Processing Unit (GPU), but also by a combination or system of such CPUs, GPUs, and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array. In general, each functional unit of the system may be implemented in the form of a circuit. System 100 may also be implemented in a distributed manner, e.g., involving different devices or apparatuses, such as distributed servers, e.g., in the form of cloud computing.

Figure 2:
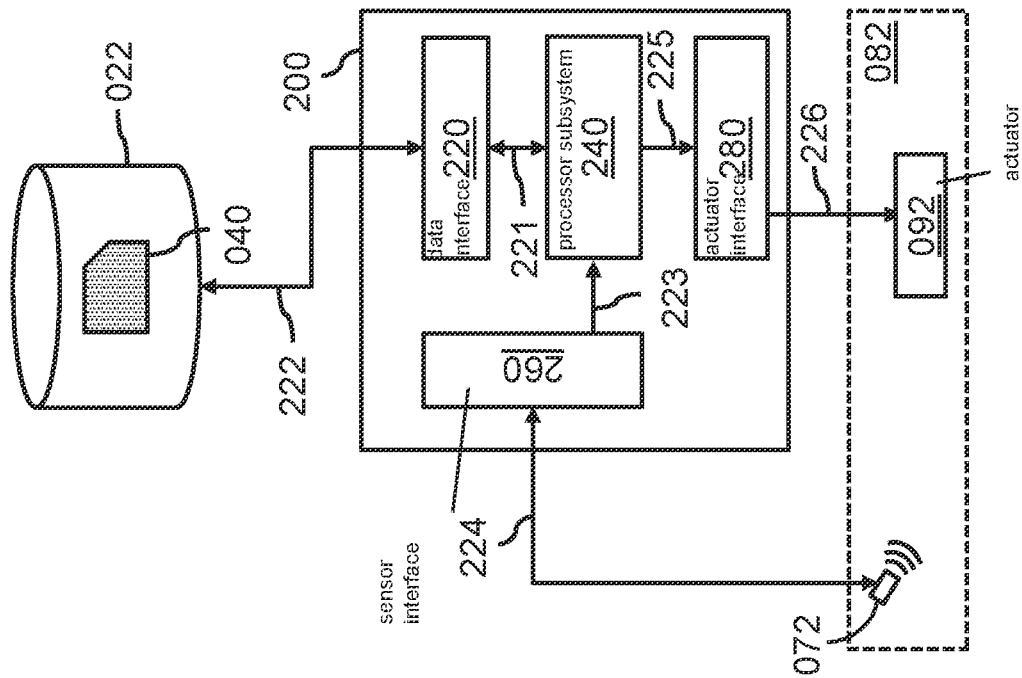
FIG. 2 shows a system for using a trained model, in accordance with an example embodiment of the present invention.

FIG. 2 shows a system 200 for using a trained model to make a time-series prediction of a computer-controlled system for controlling and/or monitoring the computer-controlled system. The model may use a stochastic differential equation (SDE) in a set of SDE variables. The SDE may comprise a drift component and a diffusion component.

The system 200 may comprise a data interface 220 and a processor subsystem 240 which may internally communicate via data communication 221. Data interface 220 may be for accessing model data 040 defining the model. The model data may comprise at least a set of parameters of a trainable part of the drift component of the SDE. The model data 040 may further define a predefined part of the drift component of the SDE. The model may be trained according to a training method as described herein, e.g., by system 100 of FIG. 1. System 200 may also be configured to train the model in addition to applying it, e.g., system 200 may be combined with system 100 of FIG. 1.

Processor subsystem 240 may be configured to, during operation of the system 200 and using the data interface 220, access data 040. For example, as shown in FIG. 2, the data interface 220 may provide access 222 to an external data storage 022 which may comprise said data 040. Alternatively, the data 040 may be accessed from an internal data storage which is part of the system 200. Alternatively, the data 040 may be received via a network from another entity. In general, the data interface 220 may take various forms, such as a network interface to a local or wide area network, e.g., the Internet, a storage interface to an internal or external data storage, etc. The data storage 022 may take any known and suitable form.

Processor subsystem 240 may be configured to, during operation of the system 200 and using the data interface 220, obtain sensor data representative of a measurement of the computer-controlled system and/or its environment. In many cases, sensor data is obtained from one or more sensors, as described below. Processor subsystem 240 may be configured to determine a time-series prediction of the computer-controlled system based on the measurement. To determine the time-series prediction, processor subsystem 240 may use the SDE to predict values of the set of SDE variables at a current time point based on values of the set of SDE variables at a previous time point, which may comprise evaluating the predefined part of the drift component to get a first drift and combining the first drift with a second drift obtained by evaluating the trainable part of the drift component. Processor subsystem 240 may also be configured to generate output data based on the determined time-series prediction for use in controlling and/or monitoring the computer-controlled system.

FIG. 2 further shows various optional components of the system 200. For example, in some embodiments, the system 200 may comprise a sensor interface 260 for directly accessing sensor data 226 acquired by a sensor 072 in an environment 082. Sensor interface 260 may internally communicate with processor subsystem 240 via data communication 223. The sensor 072 may but does not need to be part of the system 200. The sensor 072 may have any suitable form, such as an image sensor, a lidar sensor, a radar sensor, a pressure sensor, a contain temperature sensor, etc. In some embodiments, the sensor data 226 may represent sensor measurements of different physical quantities in that it may be obtained from two or more different sensors sensing different physical quantities. The sensor interface 260 may have any suitable form corresponding in type to the type of sensor, including but not limited to a low-level communication interface, e.g., based on 120 or SPI data communication, or a data storage interface of a type as described above for the data interface 220.

In some embodiments, the system 200 may comprise an actuator interface 280 for providing control data 226 to an actuator 092 in the environment 082. Such control data 226 may be generated by the processor subsystem 240 to control the actuator 092 based on a determined time-series prediction as described herein. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 5 for an (semi-)autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on a determined time-series prediction. The sensory perceptible output signal may be directly indicative of the time-series prediction, but may also represent a derived sensory perceptible output signal, e.g., for use in guidance, navigation or other type of control of the computer-controlled system. The actuator can, but does not have to be, part of system 200.

Other types of output interfaces and output devices are also possible, e.g., the output interface can be a data interface, similar to or combined with data interface 120 for outputting the generated output data to a storage also accessible by the output device; or a communication interface, e.g., a direct communication interface such as USB or IEEE 1394, or a network communication interface, e.g., a Wi-Fi or 4G connector. For example, system 200 can provide the determined time-series prediction or data derived from it, to another system, e.g., another subsystem of a vehicle that it is part of, for controlling or monitoring the vehicle based on the determined time-series prediction.

Various details and aspects of the operation of the system 200 will be further elucidated with reference to FIGS. 3-4, including optional aspects thereof.

In general, the system 200 may be embodied as, or in, a single device or apparatus, such as a workstation, e.g., laptop or desktop-based, or a server. The device may be an embedded device. The device or apparatus may comprise one or more microprocessors which execute appropriate software. For example, the processor subsystem may be embodied by a single Central Processing Unit (CPU) or Graphical Processing Unit (GPU), but also by a combination or system of such CPUs, GPUs, and/or other types of processing units. In particular, the processor subsystem may be embodied by one or more embedded processors. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. System 200 may also be implemented in a distributed manner, e.g., involving different devices or apparatuses, such as distributed servers, e.g., in the form of cloud computing. In some embodiments, the system 200 may be part of vehicle, robot or similar physical entity, and/or may be represent a control system configured to control the physical entity.

FIG. 3 shows a detailed, yet non-limiting, example of a trainable model for making time-series predictions of a computer-controlled system.

The model uses a stochastic differential equation, or SDE, in a set of SDE variables. Throughout this specification, P is used to denote the number of SDE variables. The number of SDE variables can be, for example, at most or at least 2, at most or at least 5, or at most or at least 10.

The model is parameterized by a set of trainable parameters PAR, 370. The number of parameters that are trained when training the model can for example be at most or at least 1000, at most or at least 10000, or at most or at least 1000000.

Specifically, the figure shows how the model can be used to, given values OV-xt-1, 301 of a set of observation variables at a previous time point t−1, predict noisy values NOV-yt, 361, of the set of observation variables at a current time point t.

In summary, in this example, the previous observations OV-xt-1 are first, in an operation Obs', 310, processed according to an observation model to determine values SV-ht-1, 311, of the set of SDE variables at the previous time point. The SDE is then used to predict values SV-ht, 341, of the set of SDE variables at the current time point. To this end, a predefined part PD-r, 321, of the drift component of the SDE is evaluated to get a first drift FDt, 324; and a trainable part TD-f, 322, of the drift component of the SDE is evaluated to get a second drift SDt, 325. The first and second drifts FDt, SDt are combined in a combining operation Cmb, 330, to obtain an overall drift OD, 331. The overall drift OD and a diffusion DFt, 326, computed by a trainable diffusion component TDF-g, 323, of the SDE, are then used in a prediction operation Pred, 340, to obtain the predicted values SV-ht of the set of SDE variables. In operation Obs, 350, the observation model is used to predict values OV-xt, 351, of the set of observation variables at the current time point based on the predicted values SV-xt of the set of SDE variables at the current time point. A noise model NM, 360, is finally used to predict a noisy measurement, e.g., noisy values of the set of observation variables NOV-yt, 361, at the current time point.

As a specific example, the model shown in the figure may be implemented using the following stochastic differential equation system:

$$\theta_r \sim p_{\phi_r}(\theta_r), \theta_f \sim p_{\phi_f}(\theta_f)$$

$$dh_t = (f_{\theta_f}(h_t, t) + \gamma \cdot r_\xi(h_t, t))dt + G_{\theta_g}(h_t, t)d\beta_t$$

$$x_t | h_t \sim p_\psi(x_t | h_t)$$

$$y_{t_k} | x_{t_k} \sim p(y_{t_k} | x_{t_k}), \forall t_k \in t$$

Here, $f_{\theta_f}$ is the trainable part TD-f of the drift component; $r_\xi$ is the predefined part of the drift component PD-r; $f_{\theta_f} + \gamma \cdot r_\xi$ is the combination operation CMB; $G_{\theta_g}$ is the trainable diffusion component TDF-g; $p_\psi(x_t|h_t)$ is the observation model Obs; and $p(y_{t_k}|x_{t_k})$ is the noise model NM. $\{t_1, \ldots, t_k\}$ is a set of potentially irregular time points at which observations $y_{t_k}$ are to be predicted or compared to measurements.

In more detail, this figure includes an observation model Obs that defines a probability $p_\psi(x_t|h_t)$ of observing values $x_t$ of the set of observation variables given values of the set of SDE variables $h_t$. An observation is typically represented as a D-dimensional vector in $\mathbb{R}^D$, where D can be, for example, at most or at least 10, at most or at least 100, or at most or at least 1000. Accordingly, the number of observation variables can be one or several order of magnitudes larger than the number of SDE variables. This way, the SDE can essentially perform predictions in a compressed representation of the state of the computer-controlled system, improving efficiency both in training and in use. This is not needed, however. For example, the number of observation variables can also be the same as the number of SDE variables. This way, for example, the model can be learned to dynamically adjust the representations of observation values that are used by the predefined drift model PD-r and thereby adapt the use of the predefined drift model to the observations at hand. It is also possible to combine a predefined observation model for a first subset of the SDE variables (e.g., a model that selects some or all observation variables) with a trainable observation model for a second subset of SDE variables.

As shown in the figure, the observation model Obs may be parameterized by parameters ψ from the set of parameters PAR, but this is not needed; for example, the observation model may be fixed (e.g., set to the identity) or manually defined.

Observation model Obs can be implemented in several ways. For example, the observation model can be an autoencoder (e.g., a variational auto-encoder) of which the encoder of operation Obs' determines values for the set of SDE variables given values for the set of observation variables, and the decoder of operation Obs determines values for the set of observation variables given values for the set of SDE variables. This autoencoder can be trained end-to-end with the other components of the model. Various known autoencoder architectures, e.g., using neural networks, may be applied. Generally, an observation model may comprise a function defining a probability distribution for the set of observation variables $x_t$ given values for the set of SDE variables $h_t$, e.g., by means of a neural network. In operation Obs', this function may be inverted, e.g., by performing an optimization to find values for the SDE variables that provide a good approximation to a given observation. It is also possible to use a stochastic observation model, e.g., in the form of a Bayesian neural network or an autoencoder a Bayesian encoder and/or decoder.

In various cases, for one or more "special" physical quantities to be predicted, only coarsely observed measurements may be available, whereas for other, "regular" physical quantities, more finely observed values are available. In this case, the trainable model may be trained to predict the values of the regular physical quantities as SDE variables (or equivalently, with an identity observation model), and to predict the values of the special physical quantities as outputs of the observation model. The model can thus be trained concurrently both on the fine-grained measurements of the regular physical quantities, and on the coarse-grained measurements of the special physical quantities. This, the model can be used to provide continuous predictions also of the special physical quantities, with these predictions being supported by their coarse measurements.

The use of an observation model is optional. If an observation model is not used, the set of observation variables and the set of SDE variables can coincide, and no mapping with operations Obs' and Obs is needed. Mathematically, this corresponds to using an identity function as probability density function $p_\psi$.

Operations PD-r, TD-f, and Cmb represent the determination of the overall drift OD of the SDE based on the values SV-ht-1 of the set of SDE variables at a previous time point.

The trainable part TD-f of the drift component may be mathematically denoted as $f_{\theta_r}(\cdot,\cdot)$: $\mathbb{R}^P \times \mathbb{R}_+ \to \mathbb{R}^P$, e.g., as a (typically non-linear) drift function parameterized by a set of parameters $\theta_r$, governing the vector field of the set of SDE variables $h_t \in \mathbb{R}^P$. Trainable part TD-f may satisfy L-Lipschitz continuity constraints for some $0<L<\infty$.

Similarly, the diffusion component of the SDE may be a trainable diffusion component TDF-g, provided as a matrix-valued function $G_{\theta_f}(\cdot,\cdot)$: $\mathbb{R}^P \times \mathbb{R}_+ \to \mathbb{R}^{P \times P}$, parameterized by a set of parameters $\theta_f$ governing (typically non-linear) diffusion dynamics. The diffusion part may satisfy the same continuity constraints. The sets of parameters of the trainable part of the drift component and of the diffusion component can be at least in part overlapping, e.g., $\theta_r \cap \theta_f \neq \emptyset$, to increase efficiency. The diffusion component of the SDE is typically combined with a factor representing a stochastic process, for example, a factor $\beta_t$ following Brownian motion dynamics, e.g. for any time step $\Delta t$, $\beta_t \sim \mathcal{N}(0, \Delta t)$. Other types of stochastic process are also possible, however.

For example, the trainable part TD-f of the drift component and/or the diffusion component TDF-g can be neural networks. Neural networks are also known as artificial neural networks. Examples include deep neural networks and convolutional neural networks. A neural network is typically parameterized by weights of nodes of the neural network. For example, the number of layers of the model may be at least 5 or at least 10, and the number of nodes and/or weights may be at least 1000 or at least 10000. Depending on the particular application, various known architectures for neural networks and other types of machine learnable models may be used.

Interestingly, the trainable part TD-f of the drift component and/or the diffusion component TDF-g can optionally be Bayesian models, for example, Bayesian neural networks. Accordingly, the parameters of these models (e.g., neural network weights) may themselves be random variables whose probability distributions are parametrized by respective sets of parameters. For example, the figure shows $\theta_r \sim p_{\phi_r}(\theta_r)$, $\theta_f \sim p_{\phi_f}(\theta_f)$, where the parameters $\phi_r$, $\phi_f$ are comprised in the set of trainable parameters PAR.

The predefined part PD-r of the drift component may be represented generally as a function $r_\xi(\cdot,\cdot)$ parameterized by a set of parameters $\xi$, e.g. corresponding to prior knowledge in the form of an ordinary differential equation $dh_t = r_\xi(h_t, t)dt$ in terms of the SDE variables. It is possible for the predefined part to be represented by a Bayesian model as well. The predefined part PD-r can be provided as a function of a subset of the SDE variables. The predefined part PD-r is typically non-constant, e.g., it can be non-linear or even non-polynomial. Typically, the function defining the predefined part does not represent an evaluation of a neural network or other type of machine learning model, e.g., the function defining the predefined part in many cases does not comprise softmax, ReLu, and/or activation functions such as sigmoid or a tan h function. The predefined part is also typically application-dependent in the sense that it is selected based on the computer-controlled system at hand and accordingly represents domain knowledge about the computer-controlled system. Although the predefined part can be parametrized, these parameters are typically not trained as part of training the model.

To combine the first drift FDt determined by the predefined part PD-r of the drift component and the second drift SDt determined by the trainable part TD-f of the drift component into an overall drift OD, combination operation Cmb is used. It is possible to combine the two drifts in a fixed way, e.g., as a (possibly weighted) sum or average. A preferred option is to combine the drifts according to trainable weight values for their respective values, given by set of parameters PAR. For example, the weights may be specified as a free parameter vector $\gamma \in [0,1]^P$ governing the relative importance of prior knowledge on the actual learning problem. The drifts may be combined as $f_{\theta_r}(h_t,t)+\gamma \circ r_\xi(h_t,t)$, with $\circ$ denoting element-wise multiplication. Other ways of combining, e.g., according to formula $(1-\gamma) \circ f_{\theta_r}(h_t,t)+\gamma \circ r_\xi(h_t, t)$, are also possible.

Based on the overall drift OD and an estimate DFt of the diffusion, prediction component Pred may determine a prediction of values SV-ht of the set of SDE variables at the current time point. This can be done according to the Euler-Maruyama discretization of the SDE, e.g., according to the following discrete-time probabilistic model:

$$\theta_r \sim p_{\phi_r}(\theta_r), \theta_f \sim p_{\phi_f}(\theta_f),$$

$$h_{t_0} \sim p(h_{t_0}), \text{ and for } k=0, \ldots, K-1:$$

$$h_{t_{k+1}}|h_{t_k},\theta_r,\theta_f \sim \mathcal{N}(h_{t_{k+1}}|h_{t_k}+f_{\theta_r}(h_{t_k},t_k)\Delta t_k, J\Delta t_k),$$

$$Y,X|H \sim \Pi_{k=1}^K [p(y_{t_k}|x_{t_k})p_\psi(x_{t_k}|h_{t_k})]$$

noise model NM (if using). The noise model $p(y_t|x_t)$ is a preferably likelihood function without learnable parameters, e.g., a standard normal distribution.

When using Bayesian models for the trainable part PD-r of the drift component and/or the diffusion component TDF-g, it will be noted that the model has two main sources of uncertainty for the set of SDE variables: the prior distributions $\theta_r \sim p_{\phi_r}(\theta_r)$, $\theta_f \sim p_{\phi_f}(\theta_f)$ (e.g., standard normal), and the stochastic process of the diffusion component of the SDE. The latter can represent the inherent uncertainty in the dynamical environment; the former can represent model uncertainty. This is useful especially in system identification as uncertainty accumulates through time steps.

A specific example is now given of an algorithm for determining a time-series prediction according to the model of FIG. 3. The algorithm takes as input the initial values $h_0$ for the set of SDE variables, as determined, e.g., based on sensor data indicative of a state of the computer-controlled system. For example, given values for the set of observation variables, the observation model may be used in operation Obs' as described above. This example uses ancestral sampling to sample values for random variables based on samples of the variables they depend on. Accordingly, a sampled time-series prediction is obtained.

| | |
|---|---|
| Algorithm. | Make time-series prediction |
| Inputs: | predefined part of drift component of SDE, PD-r: $r(\cdot,\cdot)$ |
| | trainable part of drift component of SDE, |
| | TD-f: $f_{\theta_r}(\cdot,\cdot)$, given as Bayesian neural net |
| | trainable diffusion component of SDE, TDF-g: |
| | $G_{\theta_f}(\cdot,\cdot)$, given as Bayesian neural net |
| | weight posteriors $q_{\phi_r}(\theta_r), q_{\phi_f}(\theta_f)$ for TD-f and TDF-g |
| | trainable observation model Obs: $p_\psi(x_t|h_t)$ |
| | initial values $h_0$ for set of SDE variables |
| | time horizon K |
| Output: | noisy predicted observations $y_k$ |
| $\theta_r \sim q_{\phi_r}, \theta_f \sim q_{\phi_f}$ | |
| for k ← 1:K | |
| $f_k \leftarrow f_{\theta_r}(h_{t_{k-1}}, t_{k-1})$ | // evaluate trainable part of drift component |
| $r_k \leftarrow r_k(h_{t_{k-1}}, t_{k-1})$ | // evaluate predefined part of drift component |
| $L_k \leftarrow G_{\phi_f}(h_{t_{k-1}}, t_{k-1})$ | // evaluate trainable diffusion component |
| $\Delta t \leftarrow t_k - t_{k-1}$ | |
| $\beta_k \sim \mathcal{N}(0, \Delta t I)$ | |
| $h_t \leftarrow h_{t_{k-1}} + (f_k + \gamma r_k)\Delta t + L_k \beta_k$ | // apply Euler-Maruyama discretization |
| $\hat{x}_k \sim p_\psi(x_k|h_k)$ | // predict observation variables using observation model |
| $y_k \sim p(y_k|\hat{x}_k)$ | // predict measurement using noise model |
| end for | |
| return $\{y_1, \ldots, y_K\}$ | | with $J=G_{\theta_f}(h_{t_k}, t_k)G_{\theta_f}(h_{t_k},t_k)^T$, $\Delta t_k = t_{k+1} - t_k$, $H=\{h_{t_1}, \ldots, h_{t_K}\}$, $X=\{x_{t_1}, \ldots, x_{t_K}\}$, and $Y=\{y_{t_1}, \ldots, y_{t_K}\}$. The distribution $p(h_{t_0})$ is defined on the initial latent state. Other discretizations apart from Euler-Maruyama are also possible. For example, the presented model can also be combined with a closed-form Gaussian assumed density scheme applied over a stochastic Runge-Kutta variant, e.g., see X. Li et al., "Stochastic Runge-Kutta accelerates Langevin Monte Carlo and beyond" (available at https://arxiv.org/abs/1906.07868 and incorporated herein by reference) and chapter 9.1 of Solin & Särkkä, "Applied Stochastic Differential Equations", 2019 (incorporated herein by reference).

Given the predicted values SV-ht of the set of SDE variables, as discussed earlier, values OV-xt of the set of observation variables can be predicted according to observation model Obs (if using). Given values OV-xt (or SV-ht if no observation model is used), noisy values NOV-yt of the set of observation variables can be predicted according to By repeatedly performing a sampling-based prediction of a time series, e.g., according to the above algorithm, multiple predictions can be obtained. Based on this, for example, a predicted mean and standard deviation at each time point can be determined.

FIG. 4 shows a detailed, yet non-limiting, example of training a model based on observations.

Shown in the figure is a trainable model TM, 400, for making time-series predictions of a computer-controlled system. The model TM may use a stochastic differential equation (SDE) in a set of SDE variables. The SDE may comprise a drift component and a diffusion component. The drift component may comprise a predefined part, e.g., representing domain knowledge about the computer-controlled system and received as an input to the training; and a trainable part, whose parameters are determined during training. A detailed example of a trainable model TM is provided in FIG. 3.

Also shown is a set of parameters PAR, 470, of the trainable model TM, that are trained as part of training the model. These parameters include at least parameters $\phi_f$ of the trainable part of the drift component. As shown in the figure, also parameters of various other parts of the model can be trained. Optionally, the diffusion component of the model is trainable and its parameters $\phi_r$ are comprised in the set of parameters PAR. Optionally, the model comprises a trainable observation model (e.g., in the form of an autoencoder, as also discussed with respect to FIG. 3), and its parameters $\psi$ are comprised in the set of parameters PAR. Optionally, the drifts determined by evaluating the predefined drift component and the trainable drift component of the model are combined according to trainable weight values $\gamma$ for respective elements of the drift, those trainable weight values being comprised in the set of parameters PAR.

Although the predefined part of the drift component can be parameterized, its parameters are not adjusted by the training and accordingly these parameters are not included in the set of parameters PAR. In particular, while not shown in the figure, it is possible to, before training the model, determine the predefined part of the drift component by fitting a parametrized differential equation to the set of observations OBS.

The model may be trained on a set of observations OBS, 400. Such an observation may comprise a time series of measurements of the computer-controlled system and/or its environment. Mathematically, such a time series may be denoted $Y=\{y_{t_1}, \ldots, y_{t_K}\}$, where K is the number of observations collected at potentially irregular time points $t=\{t_1, t_2, \ldots, t_K\}$ (e.g., $t_{i+1}-t_i$ does not need to be constant). An observation may be represented as a D-dimensional vector comprising values for respective variables from a set of observation variables (that can be the same as the set of SDE variables or different, as also discussed below and with respect to FIG. 3). Shown in the figure are two measurements of a single time-series observation of the computer-controlled system: an initial measurement MOV-y0, 401, and a measurement MOV-yt, 402, at a later point in time.

For example, the number of time points in an observation can be at least 3, at least 10, or at least 100. The number of observations can be relatively large, for example, at least 1000, or at least 10000, but this is not needed, e.g., if the number of time points per observation is large. For example, it is possible to perform training using just one observation. The overall number of measurements of observations of the set of observations OBS can be, for example, at least 1000, at least 10000 or at least 1000000.

Generally, the model may be trained by using the model to make a time-series prediction, deriving a training signal by comparing the determined time-series prediction to an observation from the set of observations OBS; and adjusting the set of parameters PAR based on the training signal.

Such training is typically performed by performing an optimization Opt, 480, of an objective function. Typically, training is performed using stochastic approaches such as stochastic gradient descent, e.g., using the Adam optimizer as disclosed in Kingma and Ba, "Adam: A Method for Stochastic Optimization" (available at https://arxiv.org/abs/1412.6980 and incorporated herein by reference). As is known, such optimization methods may be heuristic and/or arrive at a local optimum. It is possible to adjust different subsets of the set of parameters PAR in different updates, e.g., to update some subsets $\phi_f$, $\phi_r$, $\psi$, $\gamma$ of the parameters in a first iteration and (at least partially) different subsets in a second iteration. Training may be performed on an instance-by-instance basis or in batches, e.g., of at most or at least 64 or at most or at least 256 observations.

In the example shown in this figure, training is performed using maximum likelihood estimation, e.g., by marginalizing out latent variables, comparing marginal likelihoods of possible hypotheses, and choosing the one providing the highest response. Concretely, a sampling-based approach may be used in which, given an initial measurement MOV-yt of an observation of the computer-controlled system, the trained model TM may be used to determine predicted values POV-xt, 451, of the set of observation variables at a certain point in time. This can be done by ancestral sampling. Using a noise model NM, 460, a likelihood POBS p(yt|xy), 462, may be determined of the corresponding measurement MOV-yt of the observation being observed according to the determined time-series prediction. Noise model NM can be according to FIG. 3, e.g., a (multivariate) normal distribution can be used. This likelihood may then be maximized over parameters PAR.

In an observation, each time point can be predicted and compared to the observation, but this is not needed, e.g., a subset of measurements can be predicted. It is also possible to use multiple prediction time steps in between two subsequent measured observations. Generally, the use of longer time horizons is preferred for improving training stability. The time horizon used can differ per observation or even per selected observation.

As a specific example, when using Bayesian models for the trainable part of the drift component and the trainable diffusion component, training may comprise choosing values of the set of parameters PAR maximizing the following marginal likelihood:

$$\operatorname*{argmax}_{\phi_r, \phi_f, \psi} \log\left[\int\int p(Y|X)p_\psi(X|H)p(H|\theta_r, \theta_f)p_{\phi_r}(\theta_r)p_{\phi_f}(\theta_f)dXdHd\theta_r d\theta_f\right]$$

In this case, in order to marginalize over the parameters $\theta=(\theta_r, \theta_f)$ of the trainable part of the drift component and of the diffusion component, a Monte Carlo integration may be performed. That is, samples may be drawn from the distributions assigned to the parameters, and the models may be evaluated to make a prediction given these sampled parameters. Interestingly, constructing Markov chains on global model parameters is not needed: instead, it is possible to sample from the prior distribution, and use the marginal log-likelihood of the model as the objective function to train set of parameters PAR, e.g.:

$$\theta_r^s \sim p_{\phi_r}(\theta_r), \theta_f^s \sim p_{\phi_f}(\theta_f), \forall s = 1, \ldots, S,$$

$$H^s \sim p(H|\theta_r^s, \theta_f^s), \forall s = 1, \ldots, S,$$

$$\operatorname*{argmax}_{\phi_r, \phi_f, \psi} \log\left[\frac{1}{S}\sum_{k=1}^S p(Y|X^s)p_\psi(X^s|H^s)\right],$$

where S is the Monte Carlo sample count per parameter set and $p(H|\theta_r^s, \theta_f^s)$ is the distribution imposed by the SDE for the subsumed discretization t. A draw from this distribution can be taken, e.g., by applying the Euler-Maruyama discretization of the SDE using the sampled parameters $\theta_r^s$ and $\theta_f^s$ of the Bayesian models.

When applying the trained model TM during training, training performance may be improved by sampling parameters of Bayesian models (e.g., a Bayesian trainable part of the drift component and/or a Bayesian diffusion component) indirectly based on sampling values of a parameter-free random variable. For example, $f_{\theta_r}(h_t,t)$ and $G_{\theta_f}(h_t, t)$ can be neural networks, e.g., containing dense, convolutional, and/or pooling layers. In such cases, the sheer sampling approach can be too inefficient since it requires gradients to be passed on the parameters $\phi$ of the distribution $p_\phi(\theta)$ used to take samples.

One possibility to improve efficiency is to apply the so-called REINFORCE trick known from variational inference, e.g., by using that $\nabla_\phi E_{p_\phi(\theta)}[p(h|\theta)] = E_{p_\phi(\theta)}[p(h|\theta)\nabla_\phi \log p_\phi(\theta)]$.

Another option is to decompose the sampled distribution for the parameters of the Bayesian models into a parameter-free random variable $\epsilon \sim p(\epsilon)$ and a transformation function $\theta = g_\phi(\epsilon)$. This has the advantage of reducing estimator variance and allowing access to backpropagation on $p(h|\theta)$, hence more effective training. This is a variant of the so-called "reparameterization trick" used in stochastic variational inference to approximate the data term $E_{q(\theta)}[\log p(Y|\theta)]$ for some approximate posterior $q(\theta)$. Interestingly, the inventors envisaged to use a variant for weight marginalization, e.g., to approximate $\log E_{p(\theta)}[p(Y|\theta)]$. The training operation Opt can use Monte Carlo integration in combination with backpropagation of the gradients of the set of parameters, e.g., using the following objective:

$$\epsilon_r^s \sim p(\epsilon_r), \epsilon_f^s \sim p(\epsilon_f), \forall s = 1, \ldots, S,$$

$$H^s \sim p\left(H \mid \theta_r^s = g_{\phi_r}(\epsilon_r^s), \theta_f^s = g_{\phi_f}(\epsilon_f^s)\right),$$

$$\operatorname*{argmax}_{\phi_r,\phi_f,\psi} \log\left[\frac{1}{S}\sum_{k=1}^{S} p(Y \mid X^s) p_\psi(X^s \mid H^s)\right].$$

To further reduce estimator variance and strengthen training stability in the case of Bayesian neural networks, the neural networks may be evaluated by using the transformation function not to sample weights of the neural networks, but linear activations. Accordingly, statistical parameters of a linear activation of a node of the network may be determined; and the linear activation may be deterministically computed based on the statistical parameters and the values of the sampled parameter-free random variable. Accordingly, it can be avoided to use a single sample on a weight that applies the same noise on all observations; thus, suboptimal training performance due to suppression of information in the gradient signal can be avoided. This is a variant of the local re-parameterization trick known in state space models for variational inference. Interestingly, the technique is here applied to the setting of SDEs with Bayesian models. As a specific example, placing $\theta \sim \Pi_{(m,m') \in V} \mathcal{N}(\mu_{mm'}, \sigma_{mm'}^2)$, it is possible to marginalize over weights and attain the following distribution on linear activation outputs $z_{t_k}$ of a layer:

$$z_{m't_k} \sim \mathcal{N}(z_{m't_k}|\Sigma_{m=1}^M \mu_{mm'} u_{mt_k}, E_{m=1}^M \sigma_{mm'}^2, u_{mt_k}^2),$$

where $u_{mt_k}$ is the input of the neural net in the first layer and otherwise $u_{mt_k} = a(z_{mt_k})$, where a is an activation function. Sampling a parameter-free random variable then gives:

$$\epsilon_{t_k}^s \sim p(\epsilon), \forall s, k \in \{1, \ldots, S\} \times \{1, \ldots, K\},$$

$$h_{t_k}^s \sim p\left(h_{t_k}^s \mid f_{t_k}^s = g_{\phi_r}(\epsilon_{t_k}^s, h_{t_{k-1}}^s)\right),$$

$$G_{t_k}^s = g_{\phi_f}(\epsilon_{t_k}^s, h_{t_{k-1}}^s),$$

$$\operatorname*{argmax}_{\phi_r,\phi_f,\psi} \log\left[\frac{1}{S}\sum_{k=1}^{S} p(Y \mid X^s) p_\psi(X^s \mid H^s)\right].$$

Accordingly, instead of sampling weights individually, linear activations $z_{kt_n}^m$ of a neural network can be sampled, that are independent across data points. This leads to a reduction in the variance of the marginal likelihood estimate which in turn leads to a faster convergence when optimizing for the set of parameters PAR.

As shown in the figure, optimization Opt can further involve the evaluation of a regularization term Reg, 452, for minimizing a difference between the model including the trainable drift component and the model excluding the trainable drift component. This generally improves stability of the training and penalizes more complex solutions, improving generalizability of the model. For example, for the model excluding the trainable drift component, the SDE $dh_t = (\gamma \circ r_\xi(h_t, t))dt + G_{\theta_f}(h_t, t)d\beta_t$ can be used, e.g., by ignoring the drift value of the trainable drift component and leaving the model unchanged otherwise.

In particular, a good choice is to use a Kullback-Leibler (KL) divergence in the regularization term Reg. Mathematically, this Kullback-Leibler divergence may represent the divergence between the posterior distribution $Q_{0 \to T}$ on the hypothesis class, e.g., the model including the trainable drift component, and the prior distribution $P_{0 \to T}$ on the hypothesis class, e.g., the model excluding the trainable drift component. Computing a KL divergence for non-Bayesian SDEs is known per se in the context of variational inference. Interestingly, the inventors were able to show that such a divergence for non-Bayesian SDEs can be adapted to settings with a Bayesian trainable part of the drift component and/or a trainable diffusion component, namely, by including a divergence between prior distributions $p(\theta_r)$, $p(\theta_f)$ and posterior distributions $q(\theta_r)$, $q(\theta_f)$ for the parameters of these Bayesian models. Concretely, this divergence may be computed when both models are Bayesian, as:

$$D_{KL}(Q_{0 \to T} \| P_{0 \to T}) = \tfrac{1}{2} \int_0^T E_{Q_{0 \to T}}[f_{\theta_r}(h_t,t)^T J^{-1} f_{\theta_r}(h_t,t)]dt + D_{KL}(q(\theta_r)\|p(\theta_r)) + D_{KL}(q(\theta_f)\|p(\theta_f)), \text{ where } J = G_{\theta_f}(h_t,t) G_{\theta_f}(h_t,t)^T.$$

Interestingly, the divergence is not a function of parameters of the predefined part of the drift component. Accordingly, it is possible to jointly identify these parameters with $\phi_f$ and $\phi_r$.

In preferred embodiments, optimization Opt performs gradient-based training on an objective function that includes the log-likelihood for likelihoods POBS p(yt|xt), and that further includes the KL divergence-based regularization term REG for Bayesian SDE(s). In this case, it can be shown that optimization Opt provides PAC learning and accordingly provides strong mathematical guarantees on learning performance. As a concrete example, the following loss function can be used:

$$-\frac{1}{SN}\sum_{n=1}^{N}\sum_{s=1}^{S}\left\{\left[\sum_{k=1}^{K}\ln\left(p(y_{t_k}^n \mid x_{t_k}^{s,n}) p(x_{t_k}^{s,n} \mid h_{t_k}^{s,n}) \times q(h_{t_k}^{s,n} \mid h_{t_{k-1}}^{s,n}, \theta_r^{s,n}, \theta_f^{s,n}) p(h_{t_0}^{s,n})\right)\right] + \ln q(\theta_r^{s,n}) + \ln q(\theta_f^{s,n})\right\} + C_{\delta/2}(Q_{0 \to T}, P_{0 \to T}),$$

where $Y=\{y_{t_1}, \ldots, y_{t_K}\}$ are observations OBS taken at discrete and potentially irregular time points $t_1, \ldots, t_K$; T is a time horizon; and the regularization term REG is given by $$C_\delta(Q_{0 \to T}, P_{0 \to T}) := \sqrt{\frac{D_{KL}(Q_{0 \to T} \| P_{0 \to T}) + \ln\left(\frac{2\sqrt{N}}{\delta/2}\right)}{2N}},$$

including divergence $D_{KL}(Q_{0 \to T} \| P_{0 \to T})$ for some $\delta > 0$. It can be observed that, when the $\ln(\cdot)$ function is placed into its summands, the first term of this loss function is a sample approximation to $\ln p(Y_1, \ldots, Y_N)$, which is the data log-likelihood for observations OBS. Interestingly, it can be shown mathematically that a gradient step that reduces this loss function, also tightens a PAC bound on training the model parameters.

A detailed example is now given of an algorithm that can be used to derive the training signal for optimization Opt. In this example, Bayesian models are used for the trainable part of the drift component and for the diffusion component. The algorithm computes a loss term according to the above loss function. In this example, only a single sample is drawn for each observation, but the number of samples per observation can also be higher, e.g., at least five, or at least ten. By passing gradients on the set of parameters PAR, e.g., ($\phi_r$, $\phi_f$, $\psi$, $\gamma$), through this objective, optimization Opt optimizes the set of parameters given an observed set of trajectories OBS.

ing; integrating out H and X; and then using the approximate posterior distribution on the dynamics $p(\theta_r, \theta_f | Y)$ for prediction, e.g.:

$\theta_r, \theta_f \sim p(\theta_r, \theta_f | Y),$ $dh_t \sim f_{\theta_r}(h_t, t)dt + G_{\theta_f}(h_t, t)d\beta_t$ In such cases, uncertainty on the model statement, e.g., the distribution on parameters, may be inferred and averaged over during prediction. Posterior $p(\theta_r, \theta_f | Y)$ can be approximated, e.g., using variational inference (possibly based on Monte Carlo Sampling) or Markov Chain Monte Carlo (MCMC).

Figure 5:
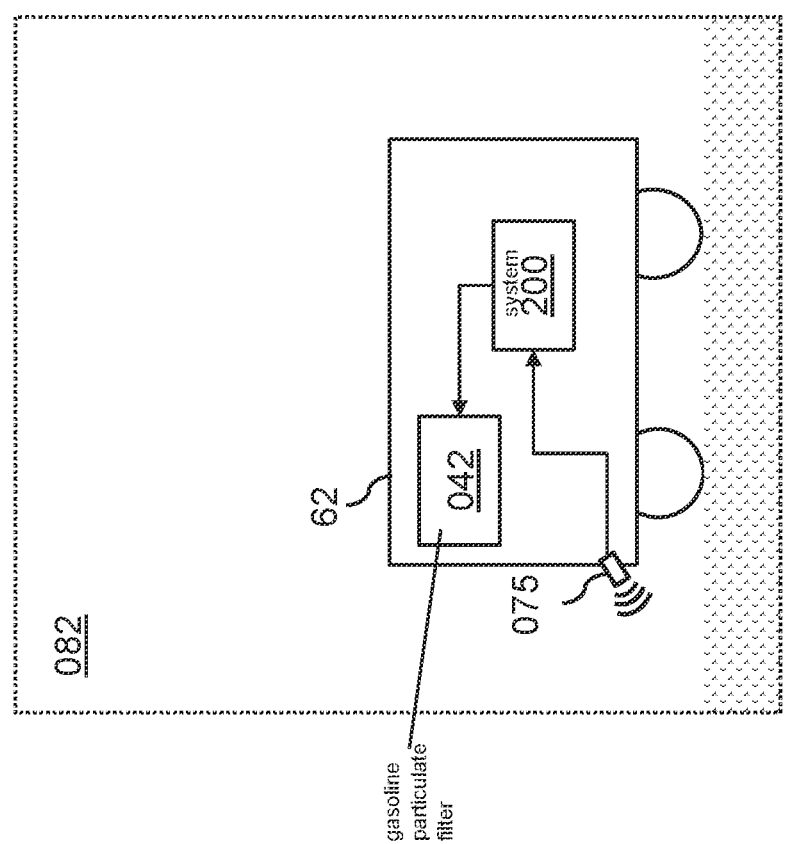
FIG. 5 shows a system for using a trained model as part of an (semi-) autonomous vehicle, in accordance with an example embodiment of the present invention.

FIG. 5 shows an example of the above, in that the system 200 is shown to be a control system of an (semi-)autonomous vehicle 62 operating in an environment 082. The vehicle 62 may be autonomous in that it may comprise an autonomous driving system or a driving assistant system, with the latter also being referred to as a semiautonomous system. The vehicle 62 may for example incorporate the system 200 in its engine controlling unit to control an operation of a gasoline particulate filter 042 based on sensor measurements of the vehicle 62 and/or its environment 082, for example, by a sensor 075.

For example, the system may predict a soot mass of the particulate filter 042 and initiate oxygen bursting or another type of cleaning operation if the soot mass is predicted to exceed a given threshold. Soot mass is an example of a measurement that during use is typically only coarsely observed, or not observed at all. Accordingly, in soot mass

---

Algorithm. Deriving training signal using E-PAC-Bayes-Hybrid loss construction
Inputs:   set of observed trajectories OBS: $\mathcal{D} = \{Y_1, \ldots, Y_N\}$ s.t. $Y_n = \{y_1^n, \ldots, y_{t_K}^n\}$;
          predefined part of drift component of SDE, PD-r: $r(\cdot, \cdot)$;
          trainable part of drift component of SDE, TD-f: $f_{\theta_r}(\cdot, \cdot)$, given as Bayesian neural net
          trainable diffusion component of SDE, TDF-g: $G_{\theta_f}(\cdot, \cdot)$, given as Bayesian neural net
          weight posteriors $q_{\phi_r}(\theta_r)$, $q_{\phi_f}(\theta_f)$ and priors $p(\theta_r)$, $p(\theta_f)$ for TD-f and TDF-g;
          trainable observation model Obs: $p_\psi(x_t | h_t)$; time horizon K;
Output:   training objective loss loglik $\leftarrow$ 0, kl $\leftarrow$ 0                          // initialize log-likelihood, Kullback-Leibler regularization term
for n $\leftarrow$ 1: N do
  $h_0^n \sim p(h_0)$                                // obtain initial values of the set of SDE variables
  $\theta_r^n \sim q_{\phi_r}$, $\theta_f^n \sim q_{\phi_f}$
  for k $\leftarrow$ 1: K do
    $f_k^n \leftarrow f_{\theta_r^n}(h_{t_{k-1}}, t_{k-1})$       //evaluate trainable part of drift component
    $r_k^n \leftarrow r_k^n(h_{t_{k-1}}, t_{k-1})$               // evaluate predefined part of drift component
    $L_k^n \leftarrow G_{\theta_f^n}(h_{t_{k-1}}, t_{k-1})$      // evaluate trainable diffusion component
    $\Delta_t \leftarrow t_k - t_{k-1}$
    $\beta_k^n \sim \mathcal{N}(0, \Delta tI)$
    $h_k^n \leftarrow h_{t_{k-1}}^n + (f_k^n + \gamma r_k^n)\Delta t + L_k^n \beta_k^n$   // apply Euler-Maruyama discretization
    $\widehat{x}_k^n \sim p_\psi(x_k^n | h_k^n)$                // predict observation variables using observation model $\text{loglik} \leftarrow \text{loglik} + \frac{1}{N}\ln p(y_k^n | \widehat{x}_k^n)$       // log-likelihood of measurement being observed kl $\leftarrow$ kl $\frac{1}{2}f_k^{n^T}(L_k^n L_k^{n^T})^{-1}f_k^n \Delta t$           // update Kullback-Leibler regularization term
  end for
end for
kl $\leftarrow$ kl + $D_{KL}(q_{\phi_r}(\theta_r)q_{\phi_f}(\theta_f) \| p(\theta_r)p(\theta_f))$       // update Kullback-Leibler regularization term loss $\leftarrow$ $-$loglik + $\sqrt{(kl + \ln(4\sqrt{N}/\delta))/(2N)}$     // determine training signal return loss

---

Although above, several examples of learning by maximum likelihood estimation is given, it is noted that this is not the only possibility. For example, optimization Opt may learn the set of parameters PAR by posterior inference. This can comprise approximating $p(\theta_r, \theta_f, H, X|Y)$ during train-prediction, intermediate physical quantities may be continuously predicted according to the SDE (e.g., using an identity observation model), the time evolution of soot mass may be predicted using its physical calculation in terms of these intermediate quantities as a second observation model. The SDE may be trained both on the finely observed intermediate values and on the coarsely observed soot mass at the same time and thus provide continuous predictions of the soot mass supported by its infrequent measurements.

Implementation options for various aspects of the model are now discussed based on a number of concrete examples. In the first example, predictions are made for a Lotka-Volterra system:

$$dx_t = (\theta_1 x_t - \theta_2 x_t y_t) dt + 0.2 d\beta_t,$$

$$dy_t = (-\theta_3 y_t + \theta_4 x_t y_t)_{dt} + 0.3 d\beta_t,$$

with $\theta = (2.0, 1.0, 4.0, 1.0)$. In this example, the sets of SDE and observation variables coincide and no trainable observation model is used. In this example, a trajectory can for example be predicted on the interval $t=[0,1]$ with a resolution of $dt=0.01$. The inventors performed experiments in which a predefined drift component part was provided in the form of a PDE with parameters $\theta'$ sampled from a normal distribution centred on the true values $\theta$ with a standard deviation of 0.5.

Specifically, in the experiments, $10^5$ Euler-Maruyama steps were taken on the interval $[0,10]$ with a time step size of $10^{-4}$, downsampling them by a factor of 100 giving 1000 observations with a frequency of 0.01. The first 500 observations on the interval $[0,5]$ were taken to be the training data and the observations in $(5,10]$ to be the test data. Each sequence is split into ten sequences of length 50. Assuming the diffusion parameters to be known and fixed, the Bayesian neural networks have a 4-layer net as the drift function with 50 neurons per layer and ReLU activation functions. The predefined part of the drift component is configured by sampling from a normal distribution centred around the true parameters $(\theta \sim \mathcal{N}(\theta, \sigma^2 I_4))$. The model is trained for 50 epochs with the Adam optimizer and a learning rate of 1e-3.

Significant improvement was observed from including this relevant but inaccurate prior knowledge. Performing PAC learning with a KL-based divergence term further improved performance.

In the second example, the computer-controlled system is modelled by a Lorenz attractor (e.g., the computer-controlled system can comprise a laser, an electronic circuit, etc.). Interestingly, with existing ODE solvers, divergence is often observed due to the chaotic nature, even in its deterministic form, of this computer-controlled system. Hence, it has inherently unsolvable dynamics. The dynamics of the system can be described as:

$$dx_t = \zeta(Y_t - x_t) + d\beta_t,$$

$$dy_t = x_t(\kappa - z_t) - y_t + d\beta_t,$$

$$dz_t = (x_t y_t - \rho z_t) + d\beta_t,$$

In this example, the sets of SDE and observation variables coincide and no trainable observation model is used. In the experiments, $\zeta=10$, $\kappa=2.67$, $\rho=28$, and $\beta_t$ is a random variable following Brownian motion with unit diffusion. In the experiment, 2000 observations from the above dynamics initiating the system at $(x(0)=1, y(0)=1, z(0)=28)$ were determined, wherein the first half was for training and the rest for testing. As predefined part of the drift component, one of the three equations governing the system was provided, with parameters distorted by a Gaussian noise.

In detail, $20^7$ Euler-Maruyama steps ahead were taken within a time step size of $10^{-4}$ and downsampling by factor 0.01, which gives a sequence of 2000 observations with frequency 0.01. The first half of this data set is split into 20 sequences of length 50 and used for training, and the second half to 10 sequences of length 100 and used for test. For all model variants, the Adam optimizer is used with learning rate 0.001, minibatch size of two, a drift net with two hidden layers of 100 neurons, and a diffusion net of 100 neurons. The model is trained for 100 epochs.

Despite the imprecision of this provided prior knowledge, a large performance leap from providing this prior knowledge was observed. Performing PAC learning with a KL-based divergence term further improved performance.

As a third example, the CMU Walking data set was used. In this experiment, first, a model with Bayesian neural networks and PAC learning was trained on the data set MOCAP-1 consisting of 43 motion capture sequences measured from 43 different subjects. The learned drift component of the learned model was then used as a predefined drift component representing vague prior knowledge on human walking dynamics. The data set MOCAP-2 with 23 walking sequences from Subject 35 was then used to represent a high-fidelity subject-specific modelling task.

The model is trained with the Adam optimizer for 3000 epochs on seven randomly chosen snippets at a time with a learning rate of $10^{-3}$. Snippet length 30 is used for the first 1000 epochs, 50 until epoch 2500, and 100 afterwards. As observation model, an auto-encoder is used with infinitesimal additive noise $\sigma^2 = 10^{-8}$ to project the 50 observation variables to six SDE variables. Separate neural nets are used for the drift and diffusion terms, each of which has one-hidden layer of 30 neurons.

Also here, providing domain knowledge improved performance. The best performance was obtained when using PAC learning with Bayesian neural networks.

FIG. 6 shows a block-diagram of computer-implemented method 600 of training a model for making time-series predictions of a computer-controlled system based on a set of observations of the computer-controlled system. The model may use a stochastic differential equation (SDE) in a set of SDE variables. The SDE may comprise a drift component and a diffusion component. The method 600 may correspond to an operation of the system 100 of FIG. 1. However, this is not a limitation, in that the method 600 may also be performed using another system, apparatus or device.

The method 600 may comprise, in an operation titled "ACCESS TRAINABLE DRIFT PARAMETERS", accessing 610 model data defining the model, the model data comprising at least a set of parameters of a trainable part of the drift component of the SDE.

The method 600 may comprise, in an operation titled "RECEIVE PREDEFINED DRIFT", receiving 620, as an input to the training, a predefined part of the drift component of the SDE.

The method 600 may comprise, in an operation titled "OBTAIN OBSERVATIONS", obtaining 630 a set of observations of the computer-controlled system. An observation may comprise a time series of measurements of the computer-controlled system and/or its environment.

The method 600 may comprise, in an operation titled "TRAIN MODEL", training 640 the model based on the set of observations. Training the model may comprise using the model to make a time-series prediction, as part of which, in an operation titled "PREDICT SDE VARIABLES", the SDE may be used to predict 650 values of the set of SDE variables at a current time point based on values of the set of SDE variables at a previous time point. Operation 650 may comprise, in an operation titled "EVALUATE PREDEFINED DRIFT", evaluating 651 the predefined part of the drift component to get a first drift. Operation 650 may further comprise, in an operation titled "COMBINE WITH TRAINABLE DRIFT", combining 652 the first drift with a second drift obtained by evaluating the trainable part of the drift component. The training operation 640 may further comprise, in an operation titled "COMPARE TO OBSERVATION", deriving 660 a training signal by comparing the time-series prediction to an observation of the set of observations. The training operation 640 may further comprise, in an operation titled "ADJUST TRAINABLE PARAMETERS", adjusting 670 at least the set of parameters of the trainable part of the drift component based on the training signal.

FIG. 7 shows a block-diagram of computer-implemented method 600 of using a trained model to make a time-series prediction of a computer-controlled system. Optionally, the prediction is made for controlling and/or monitoring the computer-controlled system. The model may use a stochastic differential equation (SDE) in a set of SDE variables. The SDE may comprise a drift component and a diffusion component. The method 600 may correspond to an operation of the system 200 of FIG. 2. However, this is not a limitation, in that the method 700 may also be performed using another system, apparatus or device.

The method 700 may comprise, in an operation titled "ACCESS TRAINED DRIFT PARAMETERS", accessing 710 model data defining the model, the model data comprising at least a set of parameters of a trained part of the drift component of the SDE. The model data may further define a predefined part of the drift component of the SDE The method 700 may comprise, in an operation titled "OBTAIN SENSOR DATA", obtaining 720 sensor data representing a measurement of the computer-controlled system and/or its environment.

The method 700 may comprise, in an operation titled "DETERMINE TIME-SERIES PREDICTION", determining 730 a time-series prediction of the computer-controlled system based on the measurement. Operation 730 may comprise, in an operation titled "PREDICT SDE VARIABLES", using the SDE to predict 750 values of the set of SDE variables at a current time point based on values of the set of SDE variables at a previous time point. Operation 750 may comprise, in an operation titled "EVALUATE PREDEFINED DRIFT", evaluating 751 the predefined part of the drift component to get a first drift. Operation 750 may further comprise, in an operation titled "COMBINE WITH TRAINABLE DRIFT", combining 752 the first drift with a second drift obtained by evaluating the trainable part of the drift component.

The method 700 may further comprise, in an operation titled "GENERATE CONTROL/MONITORING DATA", generating 760, based on the determined time-series prediction, output data for use in controlling and/or monitoring the computer-controlled system.

It will be appreciated that, in general, the operations of method 600 of FIG. 6 and method 700 of FIG. 7 may be performed in any suitable order, e.g., consecutively, simultaneously, or a combination thereof, subject to, where applicable, a particular order being necessitated, e.g., by input/output relations. Some or all of the methods may also be combined, e.g., method 700 of applying a trained model may be applied subsequently to this trained model being trained according to method 600.

The method(s) may be implemented on a computer as a computer-implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing a model for making time-series predictions of a computer-controlled system, trained as described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device described as including several means, several of these means may be embodied by one and the same item of hardware. The mere fact that certain measures are described mutually separately does not indicate that a combination of these measures cannot be used to advantage.

What is claimed is:

1. A computer-implemented method for generating and using a model of a computer-controlled system with which the computer-controlled system predicts states of the computer-controlled system for operation of the computer-controlled system, the prediction being performed by applying sensor measurements of the computer-controlled system to the trained model, the method comprising accessing, by at least one processor, model data defining a model that uses a stochastic differential equation (SDE) that includes a set of variables having a drift component and a diffusion component, wherein the drift component includes a predefined part whose parameters are fixed and a trainable part whose parameters are adjustable by a training;

using, by the at least one processor, at least one sensor of a computer-controlled system to obtain a set of observations of the computer-controlled system, each observation of the set of observations including a time series of measurements of physical quantities of the computer-controlled system and/or an environment of the computer-controlled system obtained using the at least one sensor;

training, by the at least one processor, the model based on the set of observations, the training the model including iteratively performing the following until obtainments of a final version of the adjustable parameters of the trainable part of the drift component:

using the model to make a time-series prediction of a state of the computer-controlled system, at a current time point based on values of the set of variables of the SDE that represent the measurements of the physical quantities at a previous time point, wherein the making of the prediction includes:
  evaluating the predefined part of the drift component to obtain a first drift;
  evaluating the trainable part of the drift component to obtain a second drift;
  combining the first drift and the second drift to obtain an overall drift; and
  identifying, as the predicted state, a state corresponding to the overall drift with a stochasticity characterized by the diffusion component;
deriving a training signal by comparing the time-series prediction to an observation of the set of observations; and
adjusting at least the parameters of the trainable part of the drift component based on the training signal to optimize a contribution of the trainable part of the drift component to the overall drift; and
during the operation of the computer-controlled system, a processor of the computer-controlled system:
  continually obtaining, by a processor of the computer-controlled system and from the at least one sensor of the computer-controlled system, the sensor measurements, the sensor measurements being of the physical quantities; and
  predicting, by the processor of the computer-controlled system, a current state of the computer-controlled system by applying to the model, and from the continually obtained measurements, one or more of the obtained measurements of an earlier time.

2. The method of claim 1, wherein the trainable part of the drift component and the diffusion component are Bayesian models.

3. The method of claim 2, wherein the deriving of the training signal includes using a noise model to determine a likelihood of a measurement of the observation being observed according to the determined time-series prediction, and using the determined likelihood in a maximum likelihood estimation.

4. The method of claim 3, wherein the evaluating of the trainable part of the drift component includes sampling values of a parameter-free random variable, determining statistical parameters of a linear activation of a node of the trainable part, and deterministically computing the linear activation based on the statistical parameters and the sampled values of the random variable.

5. The method of claim 3, wherein the deriving of the training signal includes evaluating a regularization term for minimizing a difference between the model including the trainable drift component and the model excluding the trainable drift component.

6. The method of claim 1, wherein the combining of the first drift and the second drift includes combining a value of the first drift and a corresponding value of the second drift according to a weight value, the weight value indicating a weight of the predefined part of the drift component in the combination, the training further including adjusting the weight value based on the training signal.

7. The method of claim 1, further comprising:
  before the training of the model, determining the predefined part of the drift component by fitting a parametrized differential equation to the set of observations.

8. A computer-implemented method implementing trained model that uses a stochastic differential equation (SDE) that includes a set of SDE variables, having a drift component and a diffusion component, wherein drift component includes a predefined part whose parameters of are fixed and a trainable part whose parameters have been adjusted by a training that optimizes a contribution of the trainable part of the drift component to an overall drift, the method comprising:
  during operation of a computer-controlled system, at least one processor performing the following:
    using at least one sensor to continually obtain a measurement of at least one physical quantity of the computer-controlled system and/or an environment of the computer-controlled system;
    using the model to make a time-series prediction of a state of the computer-controlled system at a current time point based on values of the set of variables of the SDE that represent the measurements of the physical quantities at a previous time point, wherein the making of the prediction includes:
      evaluating the predefined part of the drift component to obtain a first drift;
      evaluating the trainable part of the drift component to obtain a second drift;
      combining the first drift with a and the second drift to obtain an overall drift; and
      identifying, as the predicted state, a state corresponding to the overall drift with a stochasticity characterized by the diffusion component; and
    based on the prediction, modifying an operational parameter of the computer-controlled system controlling at least one actuator of the computer-controlled system.

9. The method of claim 8, wherein the modifying includes using an output interface to an output device which is used in the control of the computer-controlled system to output data by which the operational parameter is modified.

10. The method of claim 8, wherein the time-series prediction is of a physical state of a mechanical component of a vehicle.

11. The method of claim 10, wherein the mechanical component is an exhaust gas treatment component and/or a stack of hydrogen fuel cells and/or a particulate filter.

12. The method of claim 8, wherein the trained model is an environment model providing time-series predictions of the environment of the computer-controlled system, and the method further comprises:
  training the computer-controlled system based on generating control data for performing a simulated interaction with the environment according to the environment model.

13. The method of claim 8, wherein the trainable part of the drift component and the diffusion component are Bayesian models, and the method further comprises:
  determining an uncertainty of the time-series prediction.

14. A system for generating and using a model with which the system predicts states of a computer-controlled system for operation of the computer-controlled system, the prediction being performed by applying sensor measurements of the computer-controlled system to the trained model comprising:
  a data interface; and
  at least one processor, wherein one or more of the at least one processor in combination is configured to:
    use the data interface to access model data defining a model that uses a stochastic differential equation (SDE) that includes a set of variables having a drift component and a diffusion component, wherein the drift component includes a predefined part whose parameters are fixed and a trainable part whose parameters are adjustable by a training;

use, by the at least one processor, at least one sensor of a computer-controlled system to obtain a set of observations of the computer-controlled system, each observation of the set of observations including a time series of measurements of physical quantities of the computer-controlled system and/or an environment of the computer-controlled system obtained using the at least one sensor;

train the model based on the set of observations, the training of the model including iteratively performing the following until obtainments of a final version of the adjustable parameters of the trainable part of the drift component:

using the model to make a time-series prediction of a state of the computer-controlled system at a current time point based on values of the set of variables of the SDE that represent the measurements of the physical quantities at a previous time point, wherein the making of the prediction includes:

evaluating the predefined part of the drift component to obtain a first drift;

evaluating the trainable part of the drift component to obtain a second drift;

combining the first drift and the second drift to obtain an overall drift; and identifying, as the predicted state, a state corresponding to the overall drift with a stochasticity characterized by the diffusion component;

deriving a training signal by comparing the time-series prediction to an observation of the set of observations; and adjusting at least the parameters of the trainable part of the drift component based on the training signal to optimize a contribution of the trainable part of the drift component to the overall drift; and during the operation of the computer-controlled system:

continually obtain, from the at least one sensor of the computer-controlled system, the sensor measurements, the sensor measurements being of the physical quantities; and predict a current state of the computer-controlled system by applying to the model, and from the continually obtained measurements, one or more of the obtained measurements of an earlier time.

15. A system implementing a trained model that uses a stochastic differential equation (SDE) that includes a set of SDE variables having a drift component and a diffusion component, wherein the drift component includes a predefined part whose parameters are fixed and a trainable part whose parameters have been adjusted by a training that optimizes a contribution of the trainable part of the drift component to an overall drift, the system comprising:

a computer-controlled subsystem; and a processor subsystem, wherein, during operation of the computer-controlled subsystem, the processor subsystem is configured to:

use at least one sensor to continually obtain a measurement of at least one physical quantity of the computer-controlled subsystem and/or an environment of the computer-controlled subsystem;

use the model to make a time-series prediction of a state of the computer-controlled subsystem at a current time point based on values of the set of variables of the SDE that represent the measurements of the physical quantities at a previous time point wherein the making of the prediction includes:

evaluating the predefined part of the drift component to obtain a first drift;

evaluating the trainable part of the drift component to obtain a second drift;

combining the first drift with a and the second drift to obtain an overall drift; and identifying, as the predicted state, a state corresponding to the overall drift with a stochasticity characterized by the diffusion component; and based on the prediction, modify an operational parameter of the computer-controlled subsystem controlling at least one actuator of the computer-controlled subsystem.

16. A non-transitory computer-readable medium on which is stored instructions that are executable by a processor and that, when executed by the processor, cause the processor to perform a method implementing a trained model that uses a stochastic differential equation (SDE) that includes a set of variables having a drift component and a diffusion component, wherein the drift component includes a predefined part whose parameters are fixed and a trainable part whose parameters have been adjusted by a training that optimizes a contribution of the trainable part of the drift component to an overall drift, the method comprising:

during operation of a computer-controlled system, at least one processor performing the following:

using at least one sensor to continually obtain a measurement of at least one physical quantity of the computer-controlled system and/or an environment of the computer-controlled system, using the model to make a time-series prediction of a state of the computer-controlled system at a current time point based on values of the set of variables of the Get of SDE variables that represent the measurements of the physical quantities at a previous time point, wherein the making of the prediction includes:

evaluating the predefined part of the drift component to obtain a first drift;

evaluating the trainable part of the drift component to obtain a second drift;

combining the first drift and the second drift to obtain an overall drift; and identifying, as the predicted state, a state corresponding to the overall drift with a stochasticity characterized by the diffusion component; and based on the prediction, modifying an operational parameter of the computer-controlled system controlling at least one actuator of the computer-controlled system.

17. The method of claim 1, wherein the training further includes adjusting parameters of the diffusion component based on the training signal.

18. The method of claim 1, further comprising:

during the operation of the computer-controlled system and based on the prediction made during the operation, the processor of the computer-controlled system modifying an operational parameter of the computer-controlled system, thereby controlling at least one actuator of the computer-controlled system.

19. The method of claim 8, wherein the modifying of the operational parameter includes controlling a timing of a cleaning operation of a gasoline particulate filter of a vehicle.

20. The system of claim 14, wherein the processor of the computer-controlled system is configured to, during the operation of the computer-controlled system and based on the prediction made during the operation, modify an operational parameter of the computer-controlled system, thereby controlling at least one actuator of the computer-controlled system.

* * * * *